US005328746A

United States Patent [19]

Okuyama et al.

[11] Patent Number: 5,328,746

[45] Date of Patent: Jul. 12, 1994

[54] THERMAL TRANSFER RECORDING MEDIUM

[75] Inventors: Tetsuo Okuyama, Yokohama; Nanao Nakamura; Satoshi Takayama, both of Kawasaki; Noriaki Sato; Tadayuki Nakamura, both of Yokohama, all of Japan

[73] Assignee: Kabushiki Kaisha Toshiba, Kawasaki, Japan

[21] Appl. No.: 894,739

[22] Filed: Jun. 5, 1992

[30] Foreign Application Priority Data

Jun. 7, 1991 [JP] Japan .................................. 3-136309

[51] Int. Cl.[5] .............................................. B32B 9/00

[52] U.S. Cl. .................................. 428/195; 428/212; 428/488.1; 428/488.4; 428/522; 428/913; 428/914

[58] Field of Search ............ 428/212, 195, 484, 488.1, 428/488.4, 522, 913, 914; 156/234, 238, 240

[56] References Cited

U.S. PATENT DOCUMENTS

| | | | |
|---|---|---|---|
| 3,368,989 | 2/1968 | Wissinger et al. | 428/195 |
| 4,681,796 | 7/1987 | Maehashi et al. | 428/212 |
| 4,948,446 | 8/1990 | Yamahata et al. | 156/234 |
| 5,043,228 | 8/1991 | Yamahata et al. | 428/484 |
| 5,147,707 | 9/1992 | Hasegawa et al. | 428/212 |

FOREIGN PATENT DOCUMENTS

| | | |
|---|---|---|
| 0173532 | 3/1986 | European Pat. Off. . |
| 0381169 | 8/1990 | European Pat. Off. . |
| 0385425 | 9/1990 | European Pat. Off. . |
| 0395014 | 10/1990 | European Pat. Off. . |
| 2-277691 | 11/1990 | Japan . |
| 3-63180 | 3/1991 | Japan . |

OTHER PUBLICATIONS

Patent Abstracts of Japan, vol. 9, No. 275, (M-426), Nov. 2, 1985, & JP-A-60 120 093, Jun. 27, 1985, Kitamura Shigehiro, et al., "Thermal Transfer Recording Medium".

*Primary Examiner*—Patrick J. Ryan
*Assistant Examiner*—William A. Krynski
*Attorney, Agent, or Firm*—Oblon, Spivak, McClelland, Maier & Neustadt

[57] ABSTRACT

A thermal transfer recording medium includes a sheet-like base member and a hot-melt ink layer containing a colorant and a hot-melt material. The hot-melt ink layer contains a hot-melt material having a melting point Tm of 70° to 90° C., a complex elastic modulus of $10^6$ Pa to $10^7$ Pa at 100° C., and a pour point Tp of 150° C. or more, the hot-melt ink layer is in an amorphous or microcrystalline state and satisfies condition $I/I_0 \leqq 0.9$ where I is the diffraction peak intensity in a range of 21.3° to 21.5° originated from an ethylene-based crystal and measured by an x-ray diffraction method, and I0 is the halo intensity in a range of 16° to 17° originated from an amorphous part, or the hot-melt ink layer contains a low-melting point crystalline material having a specific acid value and a specific saponification value and 15 to 30 wt % of a specific copolymer resin whose ethylene content is 65 to 80 wt % and a melt index of 60 or less.

25 Claims, 9 Drawing Sheets

THERMAL TRANSFER RECORDING MEDIUM

BACKGROUND OF THE INVENTION

1. Field of the Invention

The present invention relates to a thermal transfer recording medium for transferring a hot-melt recording medium to a transfer medium by using a thermal head.

2. Description of the Related Art

A method of transferring a thermal transfer recording medium against a transfer medium on a thermal head at a predetermined pressure to melt a hot-melt colorant layer (ink layer) of the thermal transfer recording medium with thermal energy applied from the thermal head and to transfer the colorant layer to the transfer medium has been conventionally employed to transfer the thermal transfer recording medium to the transfer medium. During this transfer, most of the hot-melt colorant layer on the thermal transfer recording medium is transferred to the transfer medium. In order to perform recording using a thermal transfer recording medium, a thermal transfer recording medium having an area equal to or larger than a recording area is required. For this reason, a recording method using a thermal transfer recording medium is more expensive than an electrophotographic method and an ink-jet method.

In order to reduce the recording cost, a multi-time thermal transfer recording medium which can be used a plurality of times has been developed. An example of such a multi-time thermal transfer recording medium is described in Published Unexamined Japanese Patent Application No. 54-68253. In this example, a micro porous layer is formed using a resin, and a thermal ink is impregnated in the pores of the porous layer, thereby forming a thermal transfer recording medium. In this thermal transfer recording medium, the thermal ink is transferred from the pores to a transfer medium due to a permeation phenomenon. However, it takes a long period of time to melt the thermal ink with heat and cause it to permeation through the pores. The printing speed is low due to the above phenomenon, and the exudation amount of the thermal ink is also limited. As a result, it is difficult to obtain a transfer image having a high density. A proposal similar to the above prior art is made in Published Unexamined Japanese Patent Application No. 55-105579, but the same problem as described above is also posed.

Published Unexamined Japanese Patent Application No. 56-89984 discloses a multi-time thermal transfer recording medium in which an organic pigment (e.g., carbon black), a fine powder of a metal or metal oxide (e.g., aluminum or aluminum oxide), or any other inorganic pigment is added as a filler in a solid ink layer of the recording medium. A solid ink layer in the thermal transfer recording medium has a porous layer formed by the filler blended in the recording medium and a solid ink impregnated in the pores of the porous layer. The solid ink can be obtained by dissolving or dispersing a colorant such as a dye or pigment in a low-melting resin. When heat is applied to this recording medium, the solid ink is melted and exudes from the porous layer, and the exuded ink is transferred to a transfer medium. However, even this recording medium is not suitable for high-speed transfer due to the same reason as that of the micro porous layer made of the resin. In addition, it is difficult to obtain a transfer image having a high density. When a filler such as carbon black which can be is used as a colorant is used, the filler tends to be partially transferred together with a solid ink, and a color of transfer image tends to be turbidity in color recording.

Along with the recent developments of information equipments, a high-speed, compact, high-precision printer serving as an information output device has been developed. However, the multi-time thermal transfer recording medium cannot cope with high-speed printing due to poor heat response. The resultant image has poor printing quality and a low density.

A problem unique to the multi-time thermal transfer recording medium is degradation of the surface of the thermal transfer recording medium used a plurality of times, and the degraded part of medium may stain the entire surface of the transfer medium brought into tight contact therewith for image transfer. This stain tends to become conspicuous when the thermal response of the thermal transfer recording medium is increased to perform high-speed recording. When a recording equipment becomes more compact, the temperature inside the equipment during the operation is increased to stain the transfer medium more. When the equipment is heated to a high temperature as described above, problems unique to heat are posed. One problem is a reverse transfer phenomenon, i.e., an incomplete transfer phenomenon in which even if a hot-melt layer of the thermal transfer recording medium is melted and transferred to the transfer medium, it returns to the thermal transfer recording medium without being transferred to the transfer medium. Another problem is an incomplete traveling phenomenon of the thermal transfer recording medium with respect to the transfer medium, which is caused such that the hot-melt layer serves as an adhesive layer to adhere the thermal transfer recording medium to the transfer medium.

There is another method to reduce the recording cost without using the same thermal transfer recording medium a plurality of times. According to this method, the feed speeds of the thermal transfer recording medium and the transfer medium are not set in the proportion of 1:1. The feed speed of the thermal transfer recording medium is lower than that of the transfer medium (n time speed) to reduce the recording cost. This printing is called n-time speed printing.

Published Unexamined Japanese Patent Application No. 60-178088 discloses a thermal transfer recording medium characterized in that an overcoating layer containing a resin and a wax as major constituents is formed on a hot-melt ink layer. When such an overcoating layer is formed, a rubbed stain caused by a pressure acting on the thermal transfer recording medium and the transfer medium and a difference between the feed speeds of the thermal transfer recording medium and the transfer medium can be prevented. However, the n-time speed printing has a low absolute speed of the thermal transfer recording medium with respect to a thermal head. For this reason, an excessive melting phenomenon of the thermal transfer recording medium by heat accumulated in the thermal head tends to occur. A rubbed stain caused by melting of the ink upon printing and a tailing stain caused by the high viscosity of the melted ink material tend to occur.

Published Unexamined Japanese Patent Application No. 2-204092 discloses a thermal transfer recording medium and a thermal transfer recording method using a thermal transfer ink constituted by a hot-melt binder consisting of an ethylene-vinyl acetate copolymer and a wax and a colorant disposed in this binder to define a shear strength of the thermal transfer ink at room temperature (25° C.), thereby preventing a tailing stain. However, the shear strength representing the mechanical strength of the material at room temperature is not strongly associated with the tailing stain caused by the high viscosity of the molten material in view of physical properties. For this reason, there is no n-time speed thermal transfer recording medium which produces a high-density image, is suitable for high-speed transfer, and can satisfactorily solve the conventional problems described above.

SUMMARY OF THE INVENTION

It is an object of the present invention to provide a thermal transfer recording medium, wherein a hot-melt ink layer is transferred stepwise from the ink layer surface which is contact with a transfer medium in a direction of depth of the ink layer to cope with high-speed printing, achieve stable transfer characteristics and stable traveling of the ink layer even at high temperatures without causing stains, and assure sufficiently high printing quality and a sufficiently high density.

It is another object of the present invention to provide a thermal transfer recording medium suitable for multi-time use and n-time speed printing, wherein a hot-melt ink layer is transferred stepwise in the longitudinal direction of the thermal transfer recording medium to cope with high-speed printing, provide an image having sufficiently high printing quality and a sufficiently high density, eliminate a rubbed stain and a tailing stain even at high temperatures.

According to an aspect of the present invention, there is provided a thermal transfer recording medium comprising:

a sheet-like base member; and a hot-melt ink layer, formed on the sheet-like base member, containing a colorant and a hot-melt material, and selectively heated, melted, and transferred to a transfer medium, wherein the hot-melt material has a melting point Tm of 70° to 90° C., a complex elastic modulus of 106 Pa to 107 Pa at 100° C., and a pour point Tp of not less than 150° C.

According to the second aspect of the present invention, there is provided a thermal transfer recording medium comprising:

a sheet-like base member; and a hot-melt ink layer, formed on the sheet-like base member, containing a colorant, an ethylene-based low-melting crystalline material, and an ethylene-based resin member, and selectively heated, melted, and transferred to a transfer medium, wherein the hot-melt ink layer is set in an amorphous or microcrystalline state and satisfies the following condition:

$$I/I_0 \leqq 0.9$$

where I is a diffraction peak intensity in a range of 21.3° to 21.5° originated from an ethylene-based crystal and measured by an x-ray diffraction method, and $I_0$ is a halo intensity in a range of 16° to 17° originated from an amorphous part.

According to the third aspect of the present invention, there is provided a thermal transfer recording medium comprising:

a sheet-like base member; and a hot-melt ink layer, formed on the sheet-like base and containing 30 to 50 wt % of a colorant, a low-melting crystalline material having an acid value of 5 to 40 mg KOH/g and a saponification value of 10 to 100 mg KOH/g, and 15 to 30 wt % of an ethylene-based resin material containing a copolymer resin of an ethylene monomer and a monomer containing a carbonyl group, wherein the ethylene-based resin material has an ethylene content of 65 to 80 wt % and a melt index of not more than 60.

In these aspects of the present invention, the hot-melt ink layers have heat absorption peak curves preferably falling with a range of ±30° C. of peak temperature thereof upon measurement using a differential scanning calorimeter (DSC).

According to the present invention, there is provided a thermal transfer recording medium which has good transfer characteristics in multi-time printing in a high-speed printer, can satisfy both high printing quality and a high image density, can prevent the surface of a transfer medium from stains, and has stable transfer characteristics and traveling characteristics even at high temperatures. There is also provided a thermal transfer recording medium capable of forming good transfer images at high speed without causing a decrease in resolution regardless of whether a transfer medium having high or low surface smoothness is used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
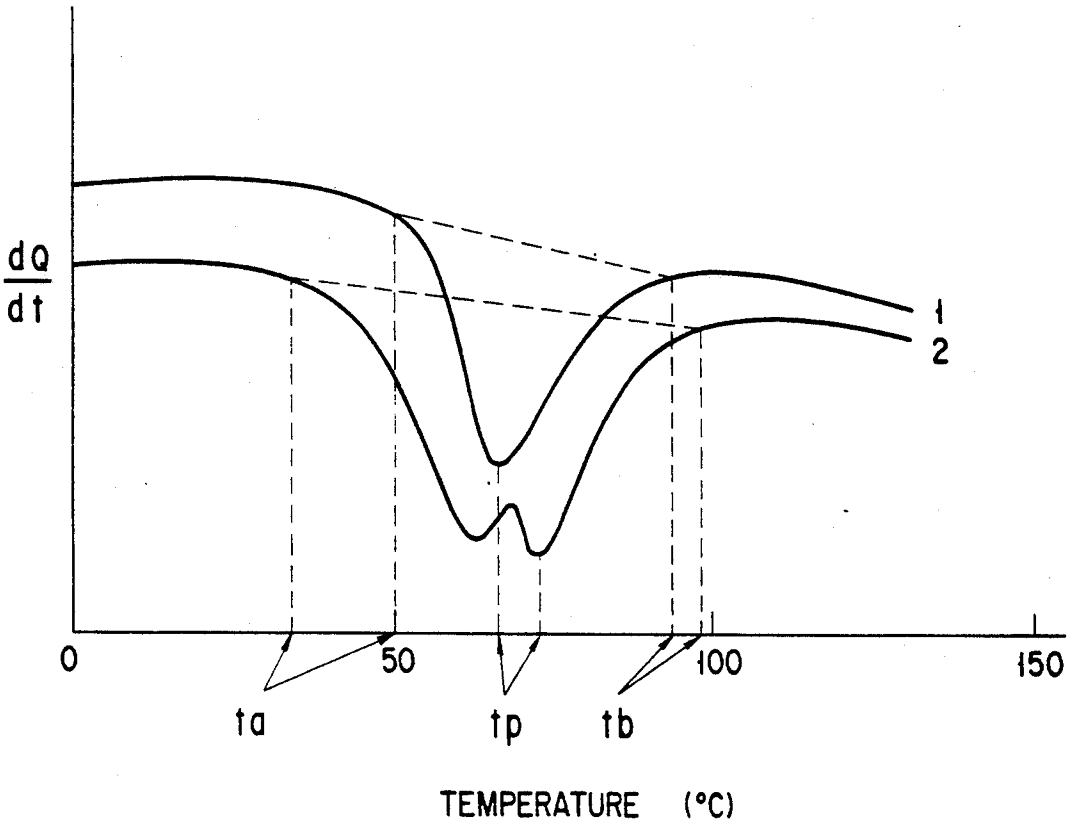
FIG. 1 is a graph showing heat absorption peak curves obtained by DSC measurements of one embodiment of a thermal transfer recording medium according to the present invention.

Thermal transfer recording media according to the present invention have the following three preferred aspects.

A thermal transfer recording medium according to the first aspect comprises a sheet-like base member and a hot-melt ink layer, formed on the sheet-like base member, containing a colorant and a hot-melt material, wherein the hot-melt material has a melting point Tm of 70° to 90° C., a complex modulus of $10^6$ Pa to $10^7$ Pa at 100° C., and a pour point Tp of 150° C. or more.

The melting point Tm and the pour point Tp defined herein indicate melting and pour points obtained in a measurement of a complex modulus to be described below.

The complex modulus of material is determined by a so-called forced osillation method in which a sample is filled in an aluminum vessel having an inner diameter of 16 mm and a depth of 3 mm, an aluminum disc having a diameter of 12 mm is vertically vibrated by a vibrator at a frequency of 3 Hz sine wave, and an complex modulus is calculated in accordance with a displacement and a stress obtained.

At this time, the elastic modulus is represented by a complex modulus E* represented as follows:

$$E^* = E' + iE''$$

where E' is the storage elastic modulus, E'' is the loss elastic modulus, and i is an imaginary number.

The magnitude of the complex modulus is represented as follows:

$$|E^*| = \{(E')^2 + (E'')^2\}^{\frac{1}{2}}$$

The sample is heated by indirect heating such that a sample cell is heated in a thermostat using air as a medium. The heating rate is 0.5° C./min.

The melting point Tm of a material is defined as a temperature corresponding to a magnitude of complex modulus of $5\times10^7$ Pa when the material is heated.

The pour point Tp is defined as a temperature at which the loss elastic modulus (E') becomes larger than the storage elastic modulus (E''), i.e., a fluid state shifted from a rubbery state in viscoelasticity.

A thermal transfer recording medium according to the present invention can realize multi-time printing by stepwise transfer of a hot-melt ink layer. This can be achieved when a composition of materials in consideration of physical properties, are selected to cause a cohesive failure phenomenon inside a hot-melt material in the hot-melt ink layer.

A hot-melt material having a melting point Tm of 70° C. or less cannot be used due to poor preservation performance at high temperatures. When the melting point Tm is 90° C. or more, the melting temperature is shifted to a high temperature to cause degradation of transfer characteristics. The melting point Tm of a hot-melt material falls within the range of 70° to 90° C., and preferably 75° to 85° C. When the melting point Tm exceeds 85° C., the material tends to cause degradation of transfer characteristics under low-temperature atmosphere, e.g., 0° to 10° C. However, when the melting point Tm is less than 75° C., transfer characteristics of the material tends to degrade with regard to shelf life test at 55° C. and long life test at ordinary temperature on the passage of time.

Preferably, this material may be easily melted by heating and may become fluid and deformed on a transfer medium by a transfer pressure. For this purpose, the material may have a complex modulus of $10^7$ Pa or less at 100° C. In order to stabilize traveling of the material at a high temperature, the mechanical strength of the molten material is preferably high. For this purpose, the complex modulus is $10^6$ Pa or more. The complex modulus at 100° C. preferably falls within the range of $8\times10^6$ to $2\times10^6$ Pa. When the complex modulus is less than $2\times10^6$ Pa, pour point of the material is decreased almost in proportion to decrease in complex modulus due to almost constant melting point, thereby stains are tend to occurred on printing. On the other hand, when the complex modulus exceeds $8\times10^6$ Pa, the material tends to deformation amount of a ink layer containing the material is decreased when transfer pressure is applied to the ink layer, this causes decrease in adhesive area between the ink layer and a transfer material, thereby transfer characteristics particularly with regard to a rough paper tends to be decreased.

The cohesive failure within the ink layer stably occurs at the central portion of a hot-melt ink layer when the hot-melt ink layer is set in a molten state and its mechanical strength does not greatly change in the direction of its thickness. A portion of the hot-melt ink layer close to a thermal head has a higher temperature than that of a portion of the hot-melt ink layer close to the transfer medium. In order to establish a condition for uniforming the mechanical strength, a range of temperature in melting condition and corresponding change in complex modulus may be minimized as possible.

According to the present invention, the above mechanical condition is established between 100° C. and 150° C., the pour point Tp of the hot-melt material is set to be 150° C. or more. However, if the molecular weight of the resin is excessively increased, the elastic module of the entire ink layer is increased to result in a large cohesion force. As a result, an adhesive failure does not occur inside the ink layer. Therefore, the adhesive failure tends to occur at the interface between the ink layer and the transfer paper. When this cohesive failure does not occur, a transfer failure such as a reverse transfer phenomenon occurs. Therefore, the pour point Tp of the hot-melt material of ink layer is preferably 200° C. or less. When the pour point Tp exceeds 200° C., the adhesive failure of the ink tends to occur at the interface between the hot-melt ink layer and the transfer paper. As a result, a transfer error tends to occur.

A thermal transfer recording medium according to the second aspect of the present invention comprises a sheet-like base member and a hot-melt ink layer, formed on the sheet-like base member, containing a colorant, an ethylene-based low-melting crystalline material, and an ethylene-based resin, wherein the hot-melt ink layer is in an amorphous or microcrystalline state and satisfies the following condition:

$$I/I_0 \leqq 0.9$$

where I is a diffraction peak intensity in a range of 21.3° to 21.5° originated from an ethylene-based crystal and measured by an X-ray diffraction method, and $I_0$ is a halo intensity in a range of 16° to 17° originated from an amorphous part.

In order to perform high-speed printing, the hot-melt ink material must be quickly melted. In the thermal transfer recording medium according to the present invention, the intensity ratio $I/I_0$ of the diffraction peak from the ethylene-based crystal to the halo intensity of the amorphous art is 0.9 or less, and crystallinity of the ethylene-based low-melting crystalline material may be remarkably low. For this reason, the hot-melt material is considered to be in a microcrystalline or amorphous state. This indicates that a low heat energy is required to melt crystal grains of wax constituting the low-melting crystalline material in a hot-melt ink layer as compared with the case in which large crystal are grown in a hot-melt ink layer, thereby melting speed of the crystal grains becomes high, and the hot-melt ink layer has a high sensitivity. The diffraction peak intensity ratio $I/I_0$ is preferably 0.8 or less.

In the thermal transfer recording medium of the present invention, the ethylene-based low-melting crystalline material is properly mixed with an ethylene-based resin material to reduce crystallinity of the ethylene-based low-melting crystalline material, although the ethylene-based low-melting crystalline material has generally high crystallinity. Isolated wax portion from the hot-melt ink layer, which causes stains is very small in amount. Therefore, stains on printing even at high temperatures are minimized.

In order to properly mix the ethylene-based low-melting crystalline material and the ethylene-based resin material, they preferably have good compatibility. For this purpose, the ethylene-based low-melting crystalline material is preferably a material containing other functional groups in addition to the ethylene structure.

The ethylene-based resin material must have good affinity such as compatibility with the ethylene-based low-melting crystalline material and may have low crystallinity to reduce the crystallinity of the resultant material. The ethylene-based resin material preferably contains 25 wt % or more of a comonomer which is copolymelyzable with ethylene monomer.

The copolymer of ethylene and a comonomer is most preferably a random copolymer. The monomer reactivity ratio of the comonomer is preferably close to that of the ethylene monomer. Such a monomer preferably has a Q value (T. Alfrey, J. J. Bohrer, H. Mark, Copolymerization (1951)) of 1.0 or less, and more preferably 0.2 or less, which value is used as measures representing reactivity of monomers. The content of the ethylene-based resin material preferably falls within the range of 20 to 30 wt % to suppress reverse transfer, adhesion, and stains which are often problems unique to the multi-time thermal transfer recording medium.

In order to properly mix the ethylene-based low-melting crystalline material with the ethylene-based resin material, set the ethylene-based low-melting crystalline material in a microcrystalline or amorphous state in the hot-melt ink layer, and minimize the isolated wax portion which causes stains, the ratio of the content of the ethylene-based low-melting crystalline material for forming the hot-melt ink layer to the content of the ethylene-based resin material is preferably 1:1 to 1:3, and the content of the ethylene-based low-melting crystalline material preferably falls within the range of 30 to 50 wt %.

The thermal transfer recording media which satisfy the physical properties of the first and second aspects have compositions represented by, e.g., the third aspect to be described below.

A thermal transfer recording medium according to the third aspect of the present invention essentially consists of a sheet-like base member and a hot-melt ink layer, formed on the sheet-like base member, and the hot-melt ink layer contains 30 to 50 wt % of a colorant, a low-melting crystalline material having an acid value of 5 to 40 mg KOH/g and a saponification value of 10 to 100 mg KOH/g, and 15 to 30 wt % of ethylene-based resin material containing a copolymer resin of an ethylene monomer and a monomer containing carbonyl groups wherein the ethylene-based resin material has an ethylene content of 65 to 80 wt % and a melt index of 60 or less.

This thermal transfer recording medium can be achieved by improving affinity of the resin material with the ethylene-based low-melting crystalline material for forming the hot-melt ink layer. When a resin having poor affinity with the ethylene-based low-melting crystalline material is mixed with a wax as the ethylene-based low-melting crystalline material, the wax and the resin may be macroscopically mixed, but they are microscopically separated from each other. Therefore, the wax component which has a low mechanical strength causes stains of the transfer medium during transfer at high temperatures.

However, since both the wax and the resin used in the third aspect according to the invention have carbonyl groups, the resin has good affinity with the wax. In order to achieve good affinity of the resin with the wax, the ethylene-based low-melting crystalline material for forming the hot-melt ink layer has an acid value of 5 to 40 mg KOH/g and a saponification value of 10 to 100 mg KOH/g. At the same time, the ethylene-based resin material for forming the hot-melt ink layer is a copolymer resin of ethylene and a monomer containing a carbonyl group, and the ethylene content of the ethylene copolymer resin preferably falls within the range of 65 to 80 wt %.

When a resin having a high molecular weight and a melt index of 60 or less is used, the melt viscoelasticity is increased, and a high stain resistance and better medium traveling even at high temperature can be achieved. However, when the molecular weight is excessively increased, the melt viscoelasticity is excessively increased to tend to degrade the transfer characteristics. Therefore, the melt index of the resin is preferably 1 or more.

When the content of the resin is 15 wt % or less, the increasing effect of the melt viscoelasticity cannot be enhanced, and printing stains cannot be prevented. However, when the content of the resin exceeds 30 wt %, the melt viscoelasticity is excessively increased to result in a transfer error.

The following organic materials melted at predetermined temperatures can be ethylene-based low-melting crystalline materials each having a carbonyl group to form a hot-melt ink layer. Examples are paraffin oxide wax, carnauba wax, candelilla wax, rice wax, wood wax, beeswax, lanolin, coconut wax, wax oxide ester, emulsion type oxide wax, urethane type wax, alcohol type wax, oxide microcrystalline wax amide wax, waxes based on montan wax (e.g., bleached montan wax, non-bleached montan wax, purified wax, acid wax, ester wax, and partially saponified ester wax), PO wax, polyethylene oxide wax, rosin methylolamide, ester gum, and a higher fatty acid.

The following low-melting crystalline materials containing no carbonyl group can be effectively added to the above low-melting crystalline materials to adjust the melting points. Examples are paraffin wax, microcrystalline wax, low-molecular weight polyethylene wax, polyethylene oxide wax, and polyethylene wax. These materials are added in a total content of 10 wt % or less in the low-melting crystalline material so as to prevent isolation of the wax from the resin.

Preferable examples of the monomer containing a carbonyl group and copolymerized with ethylene are monomers such as methylmethacrylate, ethylmethacrylate, n-propylmethacrylate, iso-propylmethacrylate, methylacrylate, ethylacrylate, n-propylacrylate, isopropylacrylate, acrylic acid, methacrylic acid, maleic acid, and vinyl acetate. Examples of the ethylene copolymer according to the present invention are a bipolymer of one of the above monomers and ethylene, and a terpolymer. In addition, a monomer such as vinyl chloride or vinylidene chloride may be used in the ethylene-based terpolymer.

Examples of the colorant constituting the hot-melt ink layer are pigments and dyes such as carbon black, Fast Yellow G, Benzidine Yellow, Pigment Yellow, Indo Fast Orange, Irgadine Red, Carmine FB, Permanent Bordeaux FRR, Pigment Orange R, Lithol Red 2G, Lake Red C, Rhodamine FB, Rhodamine B, Phthalocyanine Blue, Pigment Blue, Brilliant Green B, Phthalocyanine Green, and quinacridone, as needed. When the content of these colorants is excessively large, transfer errors occur. However, when the content of the colorants is excessively small, storage stability at high temperatures is lost. Therefore, the content of the colorants preferably falls within the range of 30 to 50 wt %. When colorants to be added have large differences in specific gravity, the preferably contents of these colorants is possible to be out of the above range. The total content of the colorants preferably falls within the range of 20 to 40 vol %.

Use of large amounts of expensive dyes and pigments as ink materials is against the object for providing an inexpensive high-quality product. Additives such as silica, quartz sand, titanium oxide, zinc oxide, talc and the like may be effectively added to 50 vol % of the coloring component.

Not that example of a base material is polyethylene terephthalate, polyethylen naphthalate film, and polyphenylene sulfide film.

The cohesive failure within the hot-melt ink layer stably occurs at the central portion of the hot-melt ink layer when the hot-melt ink layer is in a molten state and its mechanical strength does not change much in the direction of its thickness. The portion of the hot-melt ink layer close to the thermal head has a higher temperature than that of the portion of the hot-melt ink layer closer to the transfer medium. In order to establish the condition for uniforming the mechanical strength, a range of temperature corresponding to temperature dependence complex modulus in the molten material must be minimized.

In the third aspect of the present invention, 15 to 30 wt % of the resin having a melt index of 60 or less are added to the material, and additionally, the affinity of the entire material system is controlled to set the pour point Tp of 150° C. or more. The above mechanical condition is established between 100° C. and 150° C., thereby providing a thermal transfer recording medium which can cope with high-speed printing, satisfy high printing quality and a high image density, prevents the surface of the transfer recording medium from stains due to deterioration, and provide stable transfer and traveling characteristics even at high temperatures.

In order to set the pour point Tp of 150° C. or more and the rubbery state of 150° C. or more, the molecular weight of the resin must be increased. For this purpose, the melt index of the resin may be set to be 60 or less, and at the same time preferably 10 or more.

If the molecular weight of the resin is excessively increased, the elastic modulus of the ink hot-melt layer as a whole is excessively increased, this causes decrease in a deformation amount of the resin due to stress on transfer, thereby a contact area of the ink layer with the surface of a transfer medium is decreased to cause decrease of transfer characteristics, and the cohesion force is increased. As a result, the cohesive failure does not occur in the ink layer. An adhesive failure tends not to occur at the interface between the ink layer and the transfer paper. Transfer errors such as reverse transfer of the ink layer and adhesion of the ink layer tend to occur or in worst case ink layer act as adhesive between transfer recording medium and transfer medium.

In order to cope with high-speed printing, the hot-melt ink material must be quickly melted. This means that the hot-melt ink material must require only a low melting energy. The thermal properties (e.g., melting energy) of the material can be measured using the DSC (Differential Scanning Calorimeter). When DSC measurement of the hot-melt ink material is performed, a heat absorption peak curve can be obtained.

In order to obtain a thermal transfer recording medium which can cope with high-speed printing, is free from printing stains even at high temperatures, and exhibits stable traveling characteristics, this heat absorption peak curve must be as sharp as possible. That is, a peak curve is preferably obtained within the narrowest temperature range. If the heat absorption peak curve is broad, i.e., if melting characteristics are broad, it takes a long period of time to perfectly solidify the hot-melt ink material transferred to the transfer medium, and the ink material cannot be sufficiently adhered to the transfer medium. For this reason, when the thermal transfer recording medium is used a plurality of times, reverse transfer and adhesion tend to occur. During the transfer, a heat energy must be supplied at least to the temperature range in which the hot-melt ink material is perfectly melted. If the melting characteristics are broad, the above temperature range is shifted to high temperature side. In the multi-time thermal transfer recording medium, when the thickness of the hot-melt ink layer is increased to increase the number of times of transfer, the heat energy cannot be sufficiently supplied from the thermal head to the layer, the hot-melt ink material cannot be heated to the above temperature range, and transfer action may be started in this state. For this reason, when the melting characteristics are broad, incomplete printing tends to occur. In addition, when the melting characteristics are broad, the hot-melt ink material starts to soften at a low-temperature range, stains tend to be formed.

According to the thermal transfer recording medium of the present invention, since the heat absorption peak curve obtained by DSC measurement is sharp, i.e., since the hot-melt ink material can be melted within the narrow temperature range, the above problems are not posed. That is, the thermal transfer recording medium can cope with high-speed printing, is free from stains at high temperatures, and can travel stably. In order to prevent all of the reverse transfer, adhesion, and stains, melting is preferably within the range of ±30° C. of the peak temperature point. Therefore, the heat absorption peak obtained by the DSC measurement preferably falls within the range of ±30° C. of the peak temperature.

As described above, according to the present invention, there is provided a thermal transfer recording medium which has excellent transfer characteristics in multi-time printing at a high-speed printer, provides a high image density, is free from stains of the surface of the transfer recording medium, and has stable transfer and traveling characteristics even at high temperatures. There is also provided a thermal transfer recording medium capable of forming good transfer images at high speed without causing a decrease in resolution regardless of whether a transfer medium even having high or low surface smoothness is used.

EMBODIMENTS

The present invention will be described in detail by way of its embodiments and control.

EMBODIMENTS 1-1-1-5

Physical properties of waxes used in Embodiments 1-1 to 1-5 are shown in Table 1, and physical properties of resins used in Embodiments 1-1 to 1-5 are shown in Table 2.

TABLE 1

Table of Physical Properties of Waxes

| No. | Melting Point Tm °C. | Acid Value mg KOH/g | Saponification Value mg KOH/g |
|---|---|---|---|
| 1 | 75 | 12 | 30 |
| 2 | 63 | 30 | 80 |
| 3 | 75 | 0 | 0 |
| 4 | 82 | 11 | 16 |

Wax 2 in Table 1 has a melting point Tm of less than 70° C., and wax 3 has an acid value and a saponification value which fall outside the ranges according to the present invention.

TABLE 2

Table of Physical Properties of Resins

| No. | Ethylene Content | Comonomer | Melt Index |
|---|---|---|---|
| 1 | 72 | Vinyl acetate | 20 |
| 2 | 87 | Vinyl acetate | 20 |
| 3 | 72 | Vinyl Acetate | 300 |
| 4 | 75 | Methyl-methacrylate | 20 |

In Table 2 above, resin 2 has an ethylene content of 80 wt % or more, and resin 3 has a melt index of more than 60.

Thermal transfer recording media were formed using the waxes shown in Table 1 and the resins shown in Table 2 in accordance with mixing ratios in Table 3 below.

TABLE 3

Composition of Embodiment

| | Wax No. | Resin No. | Colorant | Melting point (°C.) | Magnitude of Complex Modulus ($10^6$ Pa) | Pour Point (°C.) |
|---|---|---|---|---|---|---|
| 1-1 | 1 35% | 1 35% | 45% | 78 | 8 | 170 |
| 2 | 1 35% | 4 35% | 40% | 82 | 8 | 165 |
| 3 | 4 35% | 1 35% | 45% | 85 | 7 | 160 |
| 4 | 4 35% | 4 35% | 40% | 87 | 9 | 170 |
| 5 | 4, 25% + 2, 10% | 1, 12% + 3, 8% | 45% | 78 | 4.3 | 155 |

(The colorant was carbon black PRINTEX 35 available from Degussa AG, Germany.)

The samples in Embodiments 1-1 to 1-5 could cope with high-speed printing and provided satisfactory printing quality and high image densities. In addition, the surfaces of the transfer media were not stained by the samples of Embodiments 1-1 to 1-5. Stable transfer and traveling characteristics were obtained even at high temperatures.

More specifically, a printing test was performed at 35° C. and a humidity of 85%. A printing density (solid black) measured by a Macbeth reflection densitometer was as high as 1.2 or more for the first printing cycle and was 1.0 or more for the third printing cycle. A satisfactory result was obtained in a shelf test of 55° C.×85%×96 H.

Compositions of Comparative Examples 1-1 to 1-5 are shown in Table 4 below.

TABLE 4

Composition of Comparative Example

| | Wax No. | Resin No. | Colorant | Melting point (°C.) | Magnitude of Complex Modulus ($10^6$ Pa) | Pour Point (°C.) |
|---|---|---|---|---|---|---|
| 1-1 | 2 35% | 2 20% | 45% | 74 | $5 \times 10^6$ | 155 |
| 2 | 2 35% | 2 25% | 40% | 69 | $8 \times 10^5$ | 135 |
| 3 | 2 35% | 2 20% | 45% | 80 | $7 \times 10^6$ | 160 |
| 4 | 2 35% | 3 25% | 40% | 87 | $9 \times 10^5$ | 145 |
| 5 | 3, 25% + 4, 10% | 1, 5% + 3, 15% | 45% | 80 | $4 \times 10^6$ | 120 |

In the samples of Comparative Examples 1-1 to 1-5, printing stains were considerable at high and room temperatures, and there samples were found to be defective for multi-time printing.

In particular, multi-time printing of samples of Comparative Example 1-1 and 1-2 could be performed, but these samples were poor in shelf life. Multi-time printing of samples of Comparative Examples 1-3 and 1-4 could not be performed, and printing stains were also conspicuous.

The sample of Comparative Example 1-5 has almost similar melting point but has particularly lower melting point as compared with Example 1-5.

In comparison of both examples, printing stains occurred at ordinary temperature (25° C.) and high temperature (35° C.) in the case of Comparative Example 1-5 while no stains occurred at ordinary temperature and only a little stain occurred at high temperature.

Superiority of the thermal transfer recording media of the present invention over Comparative Examples 1-1 to 1-5 was confirmed by comparison between Embodiments 1-1 to 1-5 and Comparative Examples 1-1 to 1-4.

The thermal transfer recording media as described above can be used in conventional printers such as word processors and page printers when these media are housed in commercially available cases and used as ink ribbon cassettes which can set and be fed to a position at which they oppose paper. It is also apparent from the above result that these media are preferable as multi-time ink ribbons.

Embodiments 2-1–2-77

Materials of Embodiments 2-1 to 2-77 and Comparative Examples 2-1 to 2-29 are shown as follows. Physical properties of ethylene-based low-melting crystalline materials (waxes) are shown in Table 5, and physical properties of ethylene-based resin materials are shown in Table 6. For the sake of descriptive simplicity, the materials will be represented by symbols thereinafter.

Pigment: Carbon black pigment: p-1

PRINTEX 25 (tradename) available from Degussa Ag

TABLE 5

| | Melting Point (°C.) | Acid Value mg KOH/g | Saponification Value mg KOH/g |
|---|---|---|---|
| Ethylene-based Low-melting Crystalline Wax: W-1 | 75 | 12 | 30 |
| Ethylene-based Low-melting Crystalline Wax: W-2 | 63 | 28 | 75 |
| Ethylene-based Low-melting Crystalline Wax: W-3 | 83 | 14 | 38 |
| Ethylene-based Low-melting Crystalline Wax: W-4 | 86 | 6 | 80 |

TABLE 6

| | Melt Index | Ethylene Content (wt %) | Softening Point (°C.) |
|---|---|---|---|
| Ethylene-based Resin: R-1 | 400 | 72 | 40 |
| Ethylene-based Resin: R-2 | 150 | 72 | 40 |
| Ethylene-based Resin: R-3 | 15 | 72 | 40 |

Thermal transfer recording media of Embodiments 2-1 to 2-77 were formed such that hot-melt ink layers having compositions shown in Table 7 below were formed on polyester films having back coat layers consisting of heat-resistant smooth materials, respectively. The respective materials in Table 7 were represented by symbols described in Tables 5 to 6. The numerals in Table 7 represent wt %.

TABLE 7

| Embodiment | W-1 | W-1 | W-3 | W-4 | R-1 | R-2 | R-3 | P-1 |
|---|---|---|---|---|---|---|---|---|
| 2-1 | 45 | | | | 25 | | | 30 |
| 2 | 45 | | | | | 25 | | 30 |
| 3 | 45 | | | | | | 25 | 30 |
| 4 | | 45 | | | 25 | | | 30 |
| 5 | | 45 | | | | 25 | | 30 |
| 6 | | 45 | | | | | 25 | 30 |
| 7 | | | 45 | | 25 | | | 30 |
| 8 | | | 45 | | | 25 | | 30 |

TABLE 7-continued

| Embodiment | W-1 | W-1 | W-3 | W-4 | R-1 | R-2 | R-3 | P-1 |
|---|---|---|---|---|---|---|---|---|
| 9 | | | 45 | | | | 25 | 30 |
| 10 | 45 | | | | 20 | | | 35 |
| 11 | 45 | | | | | 20 | | 35 |
| 12 | 45. | | | | | | 20 | 35 |
| 13 | | | 45 | | 20 | | | 35 |
| 14 | | | 45 | | | 20 | | 35 |
| 15 | | | 45 | | | | 20 | 35 |
| 16 | | | | 45 | | 20 | | 35 |
| 17 | | | 45 | | 20 | 20 | | 35 |
| 18 | | | 45 | | | | 20 | 35 |
| 19 | 40 | | 45 | | 20 | | | 40 |
| 20 | 40 | | | | | 20 | | 40 |
| 21 | 40 | | | | | | 20 | 40 |
| 22 | | 40 | | | 20 | | | 40 |
| 23 | | 40 | | | | 20 | | 40 |
| 24 | | 40 | | | | | 20 | 40 |
| 25 | | | 40 | | 20 | | | 40 |
| 26 | | | 40 | | | 20 | | 40 |
| 27 | | | 40 | | | | 20 | 40 |
| 28 | 35 | | | | 20 | | | 45 |
| 29 | 35 | | | | | 20 | 20 | 45 |
| 30 | 35 | | | | | | | 45 |
| 31 | | 35 | | | 20 | | | 45 |
| 32 | | 35 | | | | 20 | | 45 |
| 33 | | 35 | | | | | 20 | 45 |
| 34 | | | 35 | | 20 | | | 45 |
| 35 | | | 35 | | | 20 | | 45 |
| 36 | | | 35 | | | | 20 | 45 |
| 37 | 25 | | | 20 | 15 | | 10 | 30 |
| 38 | 25 | | | 20 | 10 | | 15 | 30 |
| 39 | 25 | | | 20 | | 15 | 10 | 30 |
| 40 | 25 | | | 20 | | 10 | 15 | 30 |
| 41 | 15 | | | 20 | 10 | 10 | | 30 |
| 42 15 | | | 20 | 10 | | 10 | 30 | |
| 43 | 15 | | | 20 | | 10 | 10 | 30 |
| 44 | | 15 | | 20 | 10 | 10 | | 30 |
| 45 | | 15 | | 20 | 10 | | 10 | 30 |
| 46 | | 15 | | 20 | | 10 | 10 | 30 |
| 47 | | | 15 | 20 | 10 | 10 | | 30 |
| 48 | | | 15 | 20 | 10 | | 10 | 30 |
| 49 | | | 15 | 20 | | 10 | 10 | 30 |
| 50 | 15 | | | 20 | 6 | | 14 | 45 |
| 51 | 15 | | | 20 | 14 | | 6 | 45 |
| 52 | 15 | | | 20 | | 6 | 14 | 45 |
| 53 | 15 | | | 20 | | 14 | 6 | 45 |
| 54 | | 15 | | 20 | 6 | | 14 | 45 |
| 55 | | 15 | | 20 | 14 | | 6 | 45 |
| 56 | | 15 | | 20 | | 6 | 14 | 45 |
| 57 | | 15 | | 20 | | 14 | 5 | 45 |
| 58 | | | 15 | 20 | 6 | | 14 | 45 |
| 59 | | | 15 | 20 | 14 | | 6 | 45 |
| 60 | | | 15 | 20 | | 6 | 14 | 45 |
| 61 | | | 15 | 20 | | 14 | 6 | 45 |
| 62 | 25 | | | 10 | 8 | | 12 | 45 |
| 63 | 25 | | | 10 | 12 | | 8 | 45 |
| 64 | 25 | | | 10 | | 8 | 12 | 45 |
| 65 | 25 | | | 10 | | 12 | 8 | 45 |
| 66 | | 25 | | 10 | 8 | | 12 | 45 |
| 67 | | 25 | | 10 | 12 | | 8 | 45 |
| 68 | | 25 | | 10 | | 8 | 12 | 45 |
| 68 | | 25 | | 10 | | 12 | 8 | 45 |
| 70 | | | 25 | 10 | 8 | | 12 | 45 |
| 71 | | | 25 | 10 | 12 | | 8 | 45 |
| 72 | | | 25 | 10 | | 8 | 12 | 45 |
| 73 | | | 25 | 10 | | 12 | 8 | 45 |

Thermal transfer recording media of Comparative Examples 2-1 to 2-29 were formed such that hot-melt ink layers having compositions shown in Table 8 below were formed on polyester films having back coat layers heat-resistant smooth materials, respectively. The respective materials in Table 8 were represented by symbols described in Tables 5 and 6. The numerals in Table 8 represent wt %.

TABLE 8

| Comparative Examples | W-1 | W-2 | W-3 | W-4 | R-1 | R-2 | R-3 | P-1 |
|---|---|---|---|---|---|---|---|---|
| 1 | 15 | | | | 25 | | | 60 |
| 2 | 15 | | | | | 25 | | 60 |
| 3 | 15 | | | | | | 25 | 60 |
| 4 | | 15 | | | 25 | | | 60 |
| 5 | | 15 | | | | 25 | | 60 |
| 6 | | 15 | | | | | 25 | 60 |
| 7 | | | 15 | | 25 | | | 45 |
| 8 | | | 15 | | | 25 | | 45 |
| 9 | | | 15 | | | | 25 | 45 |
| 10 | 40 | | | | 15 | | | 45 |
| 11 | 40 | | | | | 15 | | 45 |
| 12 | 40 | | | | | | 15 | 45 |
| 13 | | 40 | | | 15 | | | 45 |
| 14 | | 40 | | | | 15 | | 45 |
| 15 | | 40 | | | | | 15 | 45 |
| 16 | | | 40 | | 15 | | | 20 |
| 17 | | | 40 | | | 15 | | 20 |
| 18 | | | 40 | | | | 15 | 20 |
| 19 | 55 | | | | 25 | | | 20 |
| 20 | 55 | | | | | 25 | | 20 |
| 21 | 55 | | | | | | 25 | 20 |
| 22 | | 55 | | | 25 | | | 20 |
| 23 | | 55 | | | | 25 | | 20 |
| 24 | | 55 | | | | | 25 | 20 |
| 25 | | | 55 | | 25 | | | 20 |
| 26 | | | 55 | | | 25 | | 20 |
| 27 | | | 55 | | | | 25 | 20 |
| 28 | 40 | 15 | | | | | 15 | 30 |
| 29 | | 10 | 30 | | | 5 | 10 | 45 |

Each of the thermal transfer recording media of Embodiments 2-1 to 2-77 and Comparative Examples 2-1 to 2–29 was cut into a rectangular piece having a size of 30 mm×5 mm. Both ends of each sample were fixed on a slide glass using pieces of an adhesive tape, thereby obtaining an X-ray diffraction measurement sample. The diffraction intensity of each thermal transfer recording medium was measured using a X-ray diffraction apparatus (available from Nihon Denshi KK). X-ray diffraction of thermal transfer recording medium was measured by Seemann-Bohlin Method. In the X-ray diffraction apparatus, when the incident angle of a monochromatic X-ray on each sample surface is set smaller than that in a common Bragg-Brentano Method ($\theta$–$2\theta$ measurement). In this method, scattering of X-rays from the sheet-like base member is minized, a diffraction peak which cannot be normally detected, because it is concealed in the background, can be measured. The doncidion of measurement were as follows.

Target: Cu

Voltage: 50 KV

Fired incident angle: 0.1°

The diffraction intensities of the thermal transfer recording media of Embodiments 2-1 to 2-77 and Comparative Examples 2–1 to 2–29 were measured by the this Seemann-Bohlin method. Diffraction peak intensities I (cps; count/sec.) from the ethylene-based crystals, the corresponding reflection angles $2\theta$, halo intensities $I_0$ (incident angle: 16° to 17°) of the amorphous parts, and intensity ratios $I/I_0$ of the samples of Embodiments 2-1 to 2-77 were obtained from the resultant diffraction intensities and are summarized in Table 9, and those of the samples of Comparative Examples 2–1 to 2–29 are summarized in Table 10.

TABLE 9

| Embodiment | Reflection Angle ($2\theta$) | I (cps) | $I_0$ (cps) | $I/I_0$ |
|---|---|---|---|---|
| 2-1 | 21.4 | 1465 | 1703 | 0.86 |
| 2 | 21.2 | 1478 | 1760 | 0.84 |
| 3 | 21.4 | 1101 | 1932 | 0.57 |
| 4 | 21.4 | 1489 | 1673 | 0.89 |
| 5 | 21.3 | 1367 | 1627 | 0.84 |
| 6 | 21.0 | 1268 | 1838 | 0.69 |
| 7 | 21.1 | 1566 | 1956 | 0.80 |
| 8 | 21.1 | 1453 | 1863 | 0.78 |
| 9 | 21.4 | 1354 | 1634 | 0.70 |
| 10 | 21.4 | 1436 | 1651 | 0.87 |
| 11 | 21.4 | 1672 | 1990 | 0.84 |
| 12 | 21.4 | 1252 | 1897 | 0.66 |
| 13 | 21.4 | 1741 | 1956 | 0.89 |
| 14 | 21.3 | 1655 | 1994 | 0.83 |
| 15 | 21.3 | 1423 | 1801 | 0.79 |
| 16 | 21.0 | 1462 | 1949 | 0.75 |
| 17 | 21.3 | 1353 | 1879 | 0.72 |
| 18 | 21.3 | 1368 | 1927 | 0.71 |
| 19 | 21.3 | 1324 | 1697 | 0.78 |
| 20 | 21.1 | 1323 | 1890 | 0.70 |
| 21 | 21.2 | 1211 | 1922 | 0.63 |
| 22 | 21.5 | 1534 | 1918 | 0.80 |
| 23 | 21.0 | 1442 | 1803 | 0.80 |
| 24 | 21.1 | 1329 | 1927 | 0.69 |
| 25 | 21.4 | 1449 | 1882 | 0.77 |
| 26 | 21.4 | 1458 | 1846 | 0.79 |
| 27 | 21.5 | 1252 | 1869 | 0.67 |
| 28 | 21.3 | 1347 | 1952 | 0.69 |
| 29 | 21.2 | 1110 | 1947 | 0.57 |
| 30 | 21.1 | 1252 | 1869 | 0.63 |
| 31 | 21.1 | 1423 | 1923 | 0.74 |
| 32 | 21.4 | 1294 | 1961 | 0.66 |
| 33 | 21.3 | 1159 | 1964 | 0.59 |
| 34 | 21.2 | 1191 | 1985 | 0.60 |
| 35 | 21.2 | 1145 | 1877 | 0.61 |
| 36 | 21.3 | 1297 | 1936 | 0.67 |
| 37 | 21.3 | 1122 | 1700 | 0.66 |
| 38 | 21.2 | 1168 | 1980 | 0.59 |
| 39 | 21.2 | 1357 | 1967 | 0.69 |
| 40 | 21.2 | 1249 | 1810 | 0.57 |
| 41 | 21.1 | 1032 | 1811 | 0.59 |
| 42 | 21.3 | 1145 | 1941 | 0.57 |
| 43 | 21.4 | 1086 | 1975 | 0.55 |
| 44 | 21.2 | 1223 | 1911 | 0.64 |
| 45 | 21.2 | 1122 | 1781 | 0.63 |
| 46 | 21.3 | 1045 | 1771 | 0.59 |
| 47 | 21.4 | 1145 | 1974 | 0.58 |
| 48 | 21.4 | 1355 | 1964 | 0.69 |
| 49 | 21.4 | 1012 | 1879 | 0.56 |
| 50 | 21.4 | 1257 | 1905 | 0.66 |
| 51 | 21.4 | 1455 | 1993 | 0.73 |
| 52 | 21.2 | 1221 | 1878 | 0.65 |
| 53 | 21.2 | 1592 | 1990 | 0.80 |
| 54 | 21.2 | 1697 | 1928 | 0.88 |
| 55 | 21.2 | 1320 | 1886 | 0.70 |
| 56 | 21.3 | 1604 | 1933 | 0.83 |
| 57 | 21.3 | 1509 | 1818 | 0.72 |
| 58 | 21.1 | 1431 | 1988 | 0.79 |
| 59 | 21.3 | 1530 | 1937 | 0.84 |
| 60 | 21.2 | 1761 | 2096 | 0.83 |
| 61 | 21.0 | 1541 | 1857 | 0.79 |
| 62 | 21.1 | 1523 | 1928 | 0.79 |
| 63 | 21.4 | 1139 | 1651 | 0.69 |
| 64 | 21.4 | 1333 | 1877 | 0.71 |
| 65 | 21.3 | 1624 | 1957 | 0.83 |
| 66 | 21.3 | 1430 | 1857 | 0.77 |
| 67 | 21.3 | 1029 | 1744 | 0.59 |
| 68 | 21.4 | 1199 | 1966 | 0.61 |
| 69 | 21.1 | 1255 | 1992 | 0.63 |
| 70 | 21.2 | 1453 | 1964 | 0.74 |
| 71 | 21.2 | 1561 | 2001 | 0.78 |
| 72 | 21.4 | 1175 | 1704 | 0.69 |
| 73 | 21.1 | 1468 | 1906 | 0.77 |
| 74 | 21.4 | 1200 | 1700 | 0.71 |
| 75 | 21.4 | 885 | 1244 | 0.71 |
| 76 | 21.3 | 1195 | 1709 | 0.70 |
| 77 | 21.3 | 729 | 1266 | 0.58 |

TABLE 10

| Comparative Example | Incident Angle (2θ) | I (cps) | $I_0$ (cps) | $I/I_0$ |
|---|---|---|---|---|
| 1 | 21.3 | 1763 | 1712 | 1.03 |
| 2 | 21.3 | 1934 | 1727 | 1.12 |
| 3 | 21.2 | 1972 | 1826 | 1.08 |
| 4 | 21.2 | 1835 | 1748 | 1.05 |
| 5 | 21.3 | 1769 | 1608 | 1.10 |
| 6 | 21.4 | 1888 | 1869 | 1.01 |
| 7 | 21.2 | 1902 | 1598 | 1.19 |
| 8 | 21.2 | 2134 | 2013 | 1.06 |
| 9 | 21.3 | 2374 | 2219 | 1.07 |
| 10 | 21.2 | 1965 | 1638 | 1.20 |
| 11 | 21.3 | 2540 | 2209 | 1.15 |
| 12 | 21.4 | 2239 | 1736 | 1.29 |
| 13 | 21.3 | 2341 | 2251 | 1.04 |
| 14 | 21.3 | 1968 | 1587 | 1.24 |
| 15 | 21.2 | 2546 | 2005 | 1.27 |
| 16 | 21.3 | 2041 | 1759 | 1.16 |
| 17 | 21.2 | 2328 | 2116 | 1.10 |
| 18 | 21.3 | 1911 | 1874 | 1.02 |
| 19 | 21.3 | 2544 | 1884 | 1.35 |
| 20 | 21.3 | 2519 | 1634 | 1.48 |
| 21 | 21.3 | 2312 | 1806 | 1.28 |
| 22 | 21.2 | 2100 | 1533 | 1.37 |
| 23 | 21.3 | 2344 | 1639 | 1.43 |
| 24 | 21.4 | 2320 | 1706 | 1.36 |
| 25 | 21.3 | 2178 | 1756 | 1.24 |
| 26 | 21.3 | 2199 | 1653 | 1.33 |
| 27 | 21.3 | 2308 | 1592 | 1.45 |
| 28 | 21.4 | 2208 | 1768 | 1.25 |
| 29 | 21.4 | 1963 | 1810 | 1.09 |

Each of the thermal transfer recording media of Embodiments 2-1 to 2-77 and Comparative Examples 2-1 to 2-29 was mounted in a thermal transfer printer (Toshiba Personal Wordprocessor JW-95HP; printing speed: ANK 105 characters/sec.). A pattern of a character and a solid black portion was printed on thermal transfer paper (Becksmoothness: 400 sec.), and each ribbon sample was rewound to use the same position in the sample upon every printing of the pattern repeatedly. The reflection image densities of the resultant solid black transfer image patterns in the first and third printing cycles were measured using the Macbeth reflection densitometer RD 918.

Each of the thermal transfer recording media of Embodiments 2-1 to 2-77 and Comparative Examples 2-1 to 2-29 was caused to travel for printing using the above thermal transfer printer at 35xC and a humidity of 80% ten times, repeatedly. The high-temperature traveling characteristics of the thermal transfer recording media were examined during traveling, and adhesion and folding of the thermal transfer recording media, and traveling troubles were evaluated. Tailing stains at the ends of printed characters were visually evaluated for the printed characters, and fogging of the entire printed matters was visually evaluated. In addition, reverse transfer of the printed characters was also visually evaluated. The reflection image densities, printing stains, reverse transfer, and high-temperature traveling in the first and third printing cycles were checked, the results of Embodiments 2-1 to 2-77 are summarized in Table 11, and the results of Comparative Examples 2-1 to 2-29 are summarized in Table 12.

TABLE 11

| Embodiment | Image Density: First Cycle | Image Density: Third Cycle | Printing STAINS | Reverse Transfer | Traveling Trouble |
|---|---|---|---|---|---|
| 2-1 | 1.2 | 1.0 | No | No | No |
| 2 | 1.3 | 1.0 | No | No | No |
| 3 | 1.3 | 1.0 | No | No | No |
| 4 | 1.3 | 1.0 | No | No | No |
| 5 | 1.2 | 1.0 | No | No | No |
| 6 | 1.3 | 1.0 | No | No | No |
| 7 | 1.2 | 1.0 | No | No | No |
| 8 | 1.3 | 1.0 | No | No | No |
| 9 | 1.2 | 1.0 | No | No | No |
| 10 | 1.3 | 1.0 | No | No | No |
| 11 | 1.3 | 1.0 | No | No | No |
| 12 | 1.3 | 1.0 | No | No | No |
| 13 | 1.3 | 1.0 | No | No | No |
| 14 | 1.3 | 1.0 | No | No | No |
| 15 | 1.2 | 1.0 | No | No | No |
| 16 | 1.2 | 1.0 | No | No | No |
| 17 | 1.3 | 1.0 | No | No | No |
| 18 | 1.2 | 1.0 | No | No | No |
| 19 | 1.2 | 1.0 | No | No | No |
| 20 | 1.3 | 1.0 | No | No | No |
| 21 | 1.3 | 1.0 | No | No | No |
| 22 | 1.3 | 1.0 | No | No | No |
| 23 | 1.3 | 1.0 | No | No | No |
| 24 | 1.3 | 1.0 | No | No | No |
| 25 | 1.2 | 1.0 | No | No | No |
| 26 | 1.3 | 1.0 | No | No | No |
| 27 | 1.2 | 1.0 | No | No | No |
| 28 | 1.3 | 1.0 | No | No | No |
| 29 | 1.3 | 1.0 | No | No | No |
| 30 | 1.3 | 1.0 | No | No | No |
| 31 | 1.2 | 1.0 | No | No | No |
| 32 | 1.3 | 1.0 | No | No | No |
| 33 | 1.3 | 1.0 | No | No | No |
| 34 | 1.3 | 1.0 | No | No | No |
| 35 | 1.3 | 1.0 | No | No | No |
| 36 | 1.3 | 1.0 | No | No | No |
| 37 | 1.3 | 1.0 | No | No | No |
| 38 | 1.3 | 1.0 | No | No | No |
| 39 | 1.3 | 1.0 | No | No | No |
| 40 | 1.3 | 1.0 | No | No | No |
| 41 | 1.3 | 1.0 | No | No | No |
| 42 | 1.3 | 1.0 | No | No | No |
| 43 | 1.3 | 1.0 | No | No | No |
| 44 | 1.3 | 1.0 | No | No | No |
| 45 | 1.3 | 1.0 | No | No | No |
| 46 | 1.3 | 1.0 | No | No | No |
| 47 | 1.3 | 1.0 | No | No | No |
| 48 | 1.3 | 1.0 | No | No | No |
| 49 | 1.3 | 1.0 | No | No | No |
| 50 | 1.2 | 1.0 | No | No | No |
| 51 | 1.3 | 1.0 | No | No | No |
| 52 | 1.3 | 1.0 | No | No | No |
| 53 | 1.3 | 1.0 | No | No | No |
| 54 | 1.3 | 1.0 | No | No | No |
| 55 | 1.2 | 1.0 | No | No | No |
| 56 | 1.2 | 1.0 | No | No | No |
| 57 | 1.3 | 1.0 | No | No | No |
| 58 | 1.3 | 1.0 | No | No | No |
| 59 | 1.2 | 1.0 | No | No | No |
| 60 | 1.3 | 1.0 | No | No | No |
| 61 | 1.3 | 1.0 | No | No | No |
| 62 | 1.2 | 1.0 | No | No | No |
| 63 | 1.3 | 1.0 | No | No | No |
| 64 | 1.3 | 1.0 | No | No | No |
| 65 | 1.3 | 1.0 | No | No | No |
| 66 | 1.2 | 1.0 | No | No | No |
| 67 | 1.3 | 1.0 | No | No | No |
| 68 | 1.3 | 1.0 | No | No | No |
| 69 | 1.3 | 1.0 | No | No | No |
| 70 | 1.3 | 1.0 | No | No | No |
| 71 | 1.3 | 1.0 | No | No | No |
| 72 | 1.3 | 1.0 | No | No | No |
| 73 | 1.3 | 1.0 | No | No | No |
| 74 | 1.3 | 1.0 | No | No | No |
| 75 | 1.3 | 1.0 | No | No | No |
| 76 | 1.3 | 1.0 | No | No | No |
| 77 | 1.2 | 1.0 | No | No | No |
| | | | | :No | |

TABLE 12

| Embodiment | Image Density First Cycle | Image Density Third Cycle | Printing STAINS | Reverse Transfer | Traveling Trouble |
|---|---|---|---|---|---|
| 2-1 | 0.3 | 0.3 | Yes | No | No |
| 2 | 0.2 | 0.1 | Yes | No | No |
| 3 | 0.2 | 0.1 | Yes | Yes | Yes |
| 4 | 0.4 | 0.2 | Yes | Yes | No |
| 5 | 0.3 | 0.3 | Yes | Yes | No |
| 6 | 0.3 | 0.1 | Yes | Yes | Yes |
| 7 | 0.2 | 0.2 | Yes | Yes | Yes |
| 8 | 0.3 | 0.3 | Yes | Yes | Yes |
| 9 | 0.1 | 0.1 | Yes | Yes | Yes |
| 10 | 1.2 | 0.9 | Yes | No | No |
| 11 | 1.1 | 1.0 | Yes | No | No |
| 12 | 0.9 | 1.0 | Yes | No | No |
| 13 | 1.2 | 1.0 | Yes | No | No |
| 14 | 0.9 | 0.7 | Yes | No | No |
| 15 | 1.3 | 1.0 | Yes | No | No |
| 16 | 1.2 | 0.9 | Yes | No | No |
| 17 | 1.0 | 0.8 | Yes | No | No |
| 18 | 1.3 | 1.0 | Yes | No | No |
| 19 | 1.4 | 0.6 | Yes | No | No |
| 20 | 1.5 | 0.7 | Yes | No | No |
| 21 | 1.3 | 1.0 | Yes | No | No |
| 22 | 1.6 | 0.8 | Yes | No | No |
| 23 | 1.4 | 0.7 | Yes | No | No |
| 24 | 1.4 | 0.9 | Yes | No | No |
| 25 | 1.5 | 1.0 | Yes | No | No |
| 26 | 1.4 | 0.9 | Yes | No | No |
| 27 | 1.3 | 0.9 | Yes | No | No |
| 28 | 1.3 | 1.0 | Yes | No | No |
| 29 | 1.4 | 0.8 | Yes | No | No |
| | | | | :No | |
| | | | | :Yes | |

Each of the thermal transfer recording media of Embodiments 2-1 to 2-77 and Comparative Examples 2-1 to 2-29 was cut into a square piece having a side of 1 cm to obtain a DSC measurement sample. A DSC measurement of each sample at a heating rate of 5° C./min. was performed. Typical examples of the resultant heat absorption peak curves are shown in FIG. 1.

Lines (indicated by dotted lines in FIG. 1) were drawn to connect two inflection points of the resultant DSC curves shown in FIG. 1 to obtain temperatures as the intersections between the straight lines and the DSC curves. Low temperatures were defined as ta, and high temperatures were defined as tb. Heat absorption peak temperatures of the DSC curves were defined as tp. Like the two DSC curves in FIG. 1, if two or more peaks regarded as heat absorption peaks were present, the largest magnitude of the peaks was selected, and the temperature corresponding to the selected peak was defined as tp. Therefore, the temperatures ta, tp, and tb were measured from the resultant DSC curves of Embodiments 2-1 to 2-73 and Comparative Examples 2-1 to -27, and the results are summarized in Tables 13 and 14.

TABLE 13

| Embodiment | ta (°C.) | tp (°C.) | tb (°C.) |
|---|---|---|---|
| 2-1 | 53 | 74 | 91 |
| 2 | 46 | 75 | 87 |
| 3 | 49 | 73 | 82 |
| 4 | 50 | 68 | 79 |
| 5 | 53 | 61 | 84 |
| 6 | 42 | 62 | 85 |
| 7 | 52 | 80 | 93 |
| 8 | 59 | 81 | 90 |
| 9 | 54 | 81 | 93 |
| 10 | 58 | 76 | 92 |
| 11 | 46 | 78 | 87 |
| 12 | 53 | 74 | 94 |
| 13 | 43 | 67 | 91 |

TABLE 13-continued

| Embodiment | ta (°C.) | tp (°C.) | tb (°C.) |
|---|---|---|---|
| 14 | 44 | 62 | 82 |
| 15 | 46 | 63 | 81 |
| 16 | 54 | 82 | 92 |
| 17 | 56 | 84 | 96 |
| 18 | 52 | 83 | 98 |
| 19 | 49 | 73 | 93 |
| 20 | 44 | 70 | 97 |
| 21 | 48 | 71 | 97 |
| 22 | 40 | 64 | 94 |
| 23 | 42 | 68 | 97 |
| 24 | 41 | 70 | 99 |
| 25 | 53 | 80 | 101 |
| 26 | 57 | 81 | 97 |
| 27 | 59 | 82 | 99 |
| 28 | 40 | 77 | 107 |
| 29 | 49 | 79 | 103 |
| 30 | 54 | 76 | 102 |
| 31 | 38 | 60 | 86 |
| 32 | 36 | 62 | 84 |
| 33 | 45 | 64 | 90 |
| 34 | 59 | 85 | 100 |
| 35 | 61 | 85 | 99 |
| 36 | 56 | 82 | 109 |
| 37 | 50 | 79 | 101 |
| 38 | 59 | 80 | 102 |
| 39 | 61 | 82 | 109 |
| 40 | 57 | 81 | 110 |
| 41 | 60 | 83 | 104 |
| 42 | 51 | 79 | 99 |
| 43 | 52 | 79 | 94 |
| 44 | 47 | 73 | 102 |
| 45 | 51 | 74 | 98 |
| 46 | 45 | 72 | 93 |
| 47 | 54 | 84 | 113 |
| 48 | 53 | 81 | 110 |
| 49 | 55 | 81 | 106 |
| 50 | 52 | 77 | 103 |
| 51 | 46 | 74 | 100 |
| 52 | 52 | 76 | 105 |
| 53 | 50 | 76 | 106 |
| 54 | 41 | 70 | 99 |
| 55 | 39 | 68 | 90 |
| 56 | 42 | 69 | 97 |
| 57 | 38 | 66 | 91 |
| 58 | 53 | 81 | 101 |
| 59 | 57 | 84 | 110 |
| 60 | 56 | 80 | 104 |
| 61 | 59 | 82 | 111 |
| 62 | 52 | 78 | 99 |
| 63 | 49 | 79 | 107 |
| 64 | 51 | 76 | 105 |
| 65 | 52 | 79 | 101 |
| 66 | 43 | 70 | 92 |
| 67 | 45 | 71 | 97 |
| 68 | 40 | 69 | 98 |
| 69 | 43 | 71 | 93 |
| 70 | 52 | 80 | 109 |
| 71 | 63 | 84 | 114 |
| 72 | 56 | 85 | 112 |
| 73 | 59 | 85 | 110 |
| 74 | 48 | 84 | 80 |
| 75 | 54 | 80 | 107 |
| 76 | 58 | 83 | 110 |
| 77 | 57 | 82 | 111 |

TABLE 14

| Comparative Example Embodiment | ta (°C.) | tp (°C.) | tb (°C.) |
|---|---|---|---|
| 2-1 | 31 | 77 | 103 |
| 2 | 29 | 79 | 98 |
| 3 | 35 | 74 | 110 |
| 4 | 36 | 62 | 100 |
| 5 | 28 | 60 | 94 |
| 6 | 31 | 64 | 99 |
| 7 | 48 | 82 | 109 |
| 8 | 54 | 81 | 112 |
| 9 | 50 | 85 | 111 |
| 10 | 47 | 74 | 109 |

TABLE 14-continued

| Comparative Example Embodiment | ta (°C.) | tp (°C.) | tb (°C.) |
|---|---|---|---|
| 11 | 38 | 77 | 108 |
| 12 | 39 | 73 | 102 |
| 13 | 31 | 64 | 92 |
| 14 | 30 | 64 | 90 |
| 15 | 34 | 62 | 89 |
| 16 | 39 | 80 | 106 |
| 17 | 43 | 82 | 111 |
| 18 | 30 | 81 | 108 |
| 19 | 36 | 70 | 99 |
| 20 | 39 | 71 | 103 |
| 21 | 32 | 69 | 112 |
| 22 | 34 | 60 | 95 |
| 23 | 35 | 63 | 91 |
| 24 | 31 | 59 | 89 |
| 25 | 40 | 79 | 108 |
| 26 | 43 | 77 | 99 |
| 27 | 51 | 80 | 116 |
| 28 | 30 | 74 | 102 |
| 29 | 38 | 75 | 107 |

As can be apparent form Table 9, each thermal transfer recording medium according to the present invention has a diffraction peak intensity ratio $I/I_0$ of 0.9 or less to result in low crystallinity, thereby providing a high sensitivity. This medium can cope with high-speed printing. This is apparent from the results in Tables 8 and 10. That is, an image density of 1.0 or more can be obtained in the third printing cycle. This medium is free from printing stains, reverse transfer, and traveling troubles. In addition, melting is completed within the range of ±30° C. of the melting point, and the melting characteristic curve is sharp. Therefore, the thermal transfer recording medium according to the present invention can apparently and sufficiently cope with high-speed printing.

Figure 2:
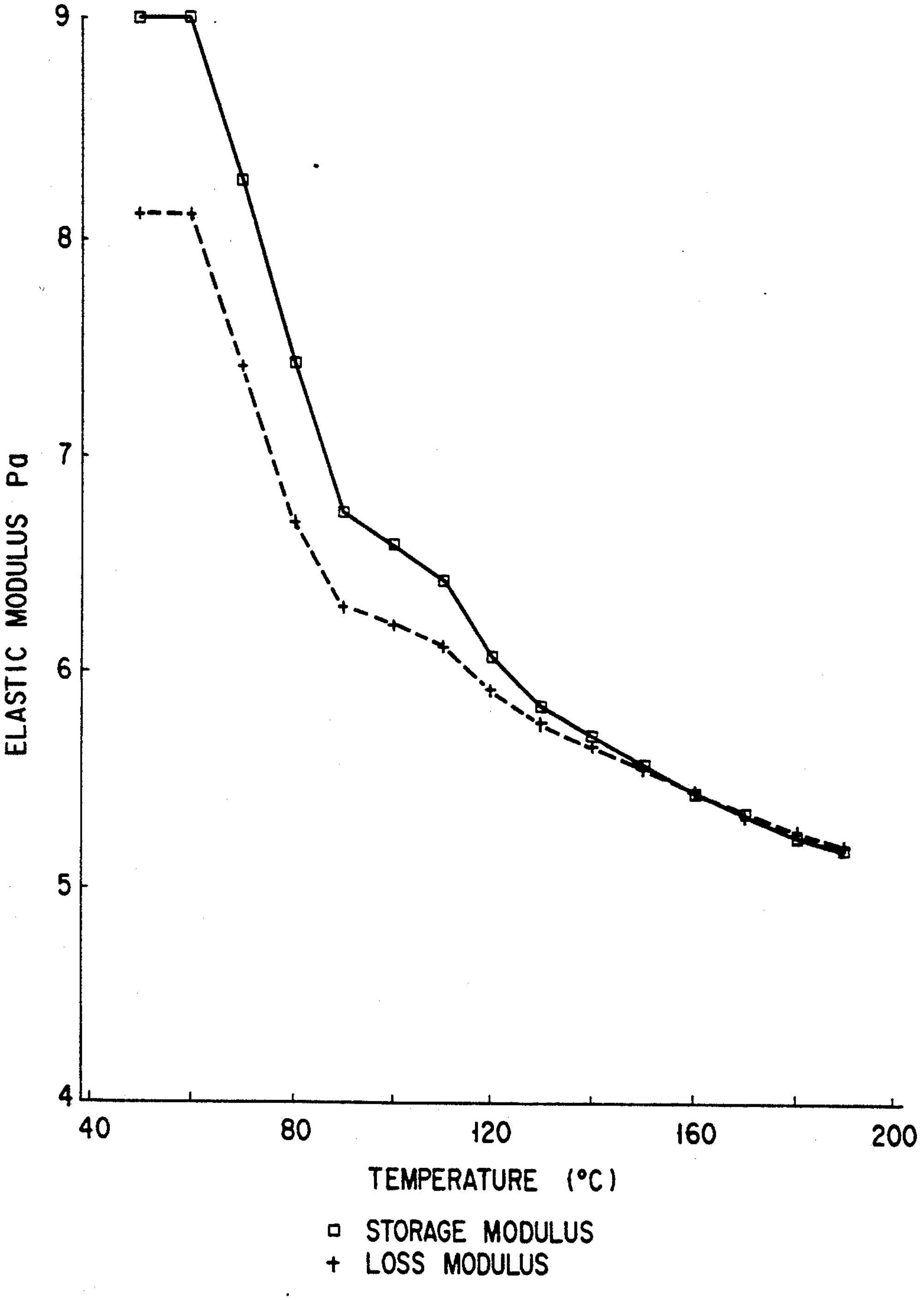
FIG. 2 is a graph showing a relationship between temperature and complex modulus at a frequency of 3 Hz with regard to a hot-melt ink layer according to Example 1-5.
Figure 3:
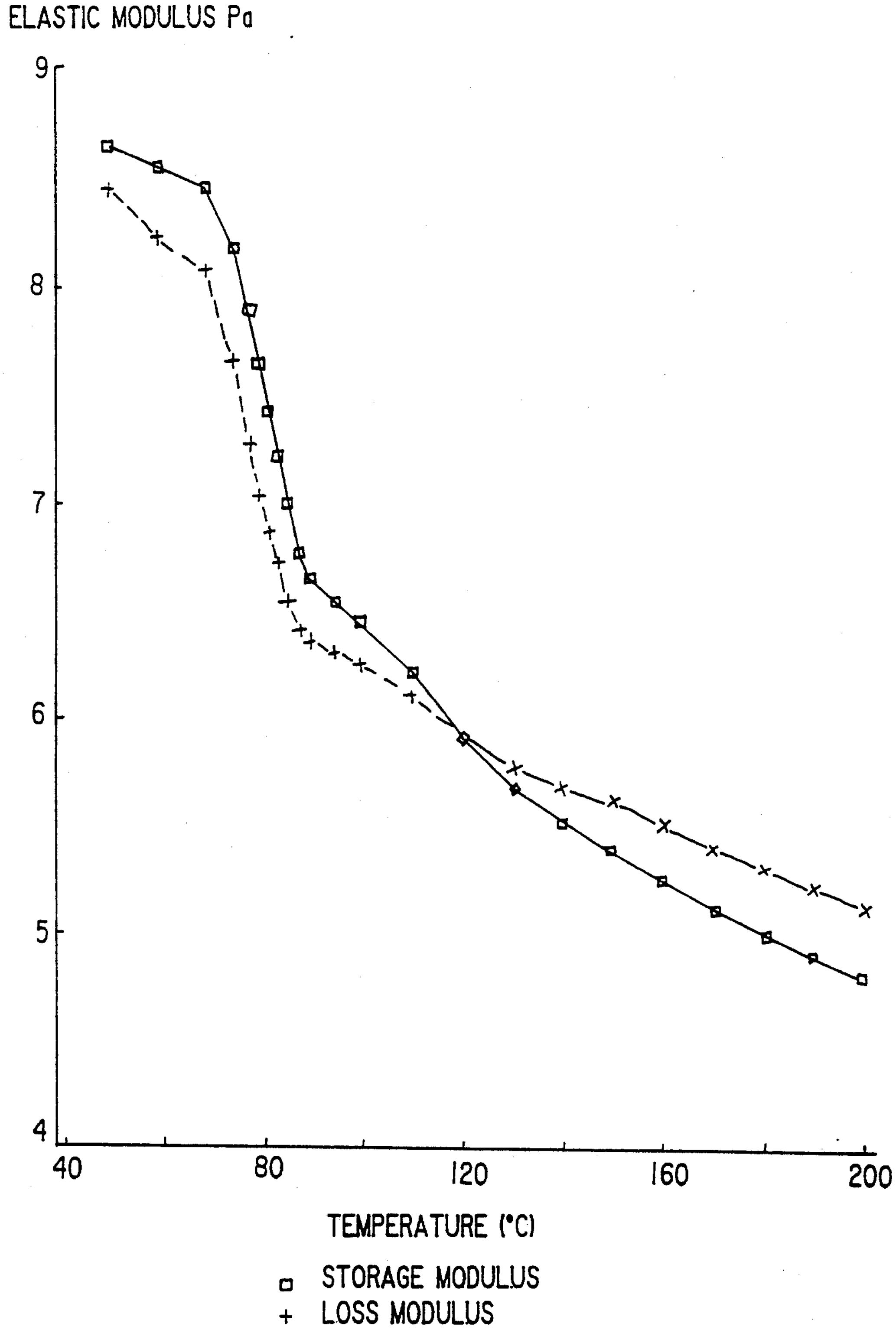
FIG. 3 is a graph showing a relationship between temperature and complex modulus at a frequency of 3 Hz with regard to a hot-melt ink layer according to Control 1-5.
Figure 4:
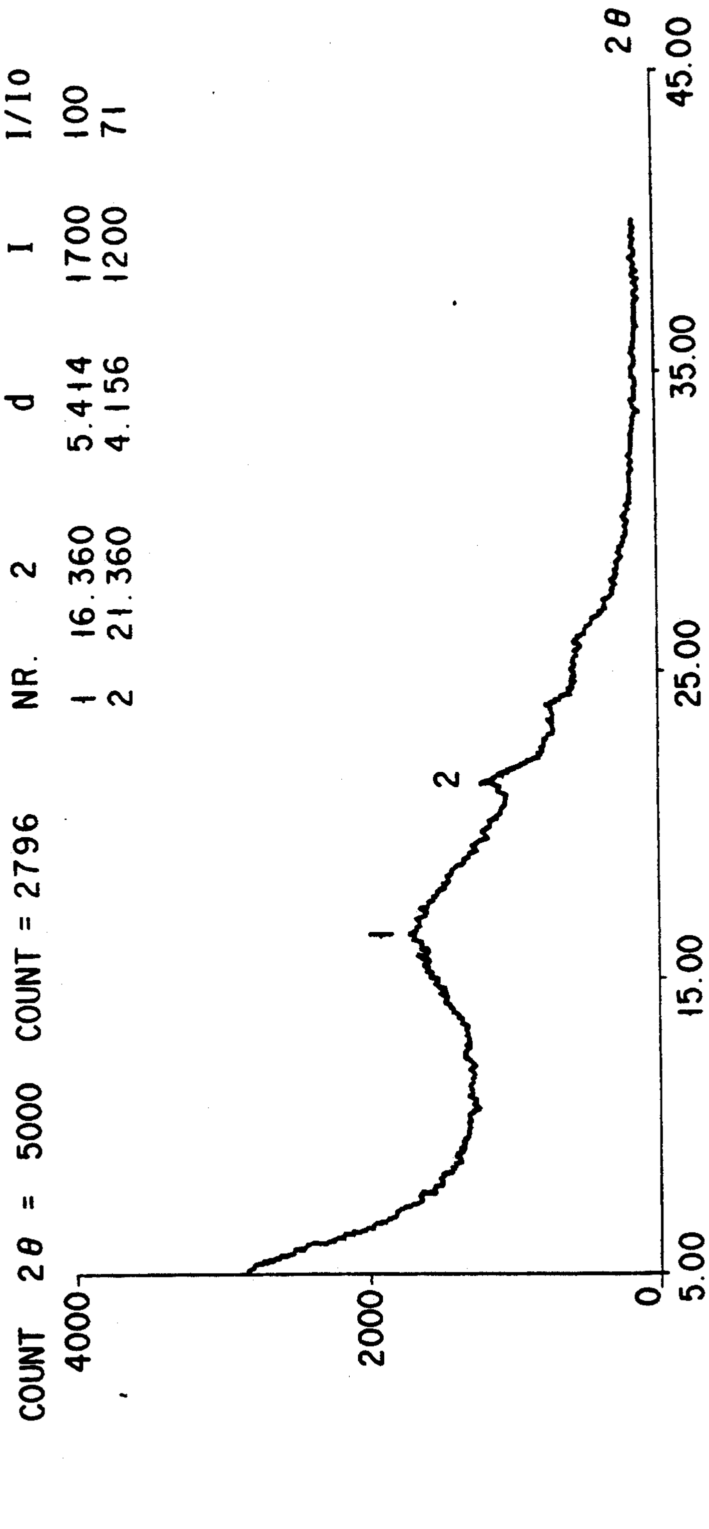
FIG. 4 is a graph showing an x-ray diffraction data obtained by Seemann-Bohlin method of an hot-melt ink layer according to Example 2-74 in condition that fixed angle of incidence is 0.1.
Figure 5:
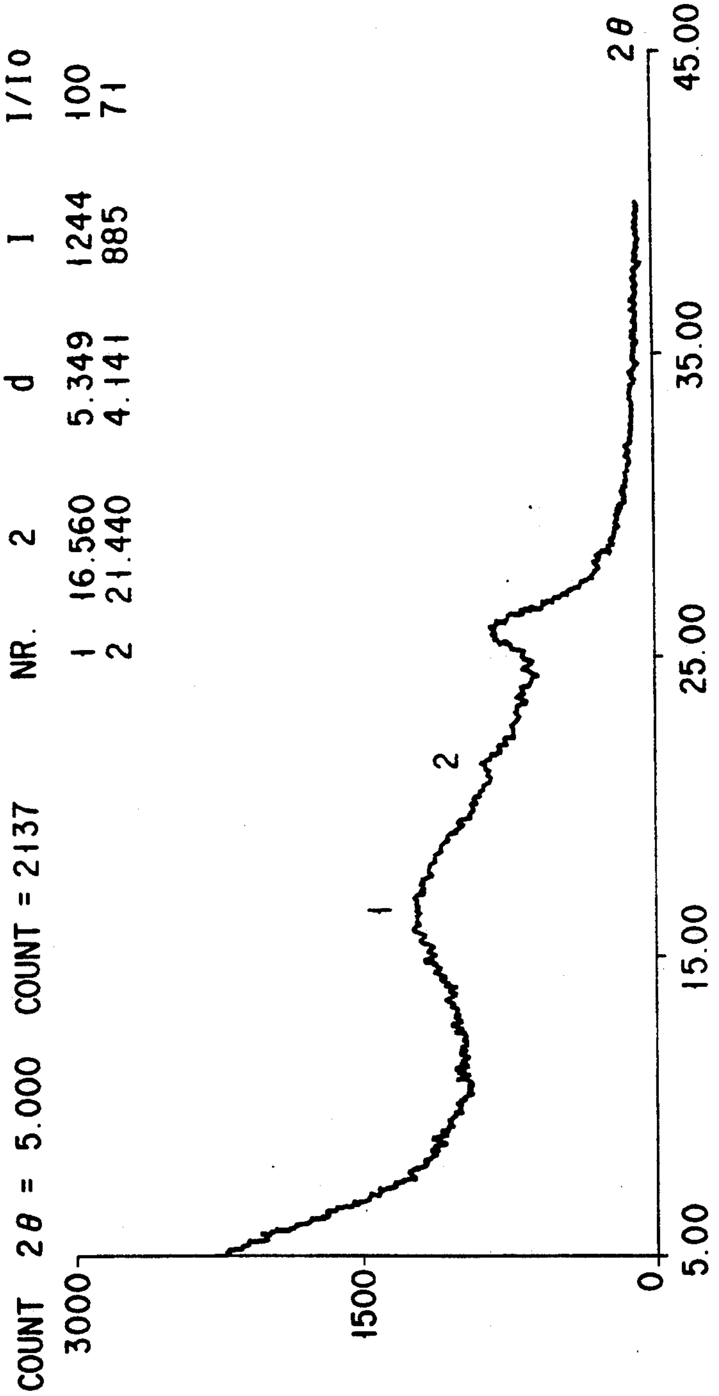
FIG. 5 is a graph showing an X-ray diffraction data obtained by Seemann-Bohlin method of an hot-melt ink layer according to Example 2-75 in the same condition as that in FIG. 4.
Figure 6:
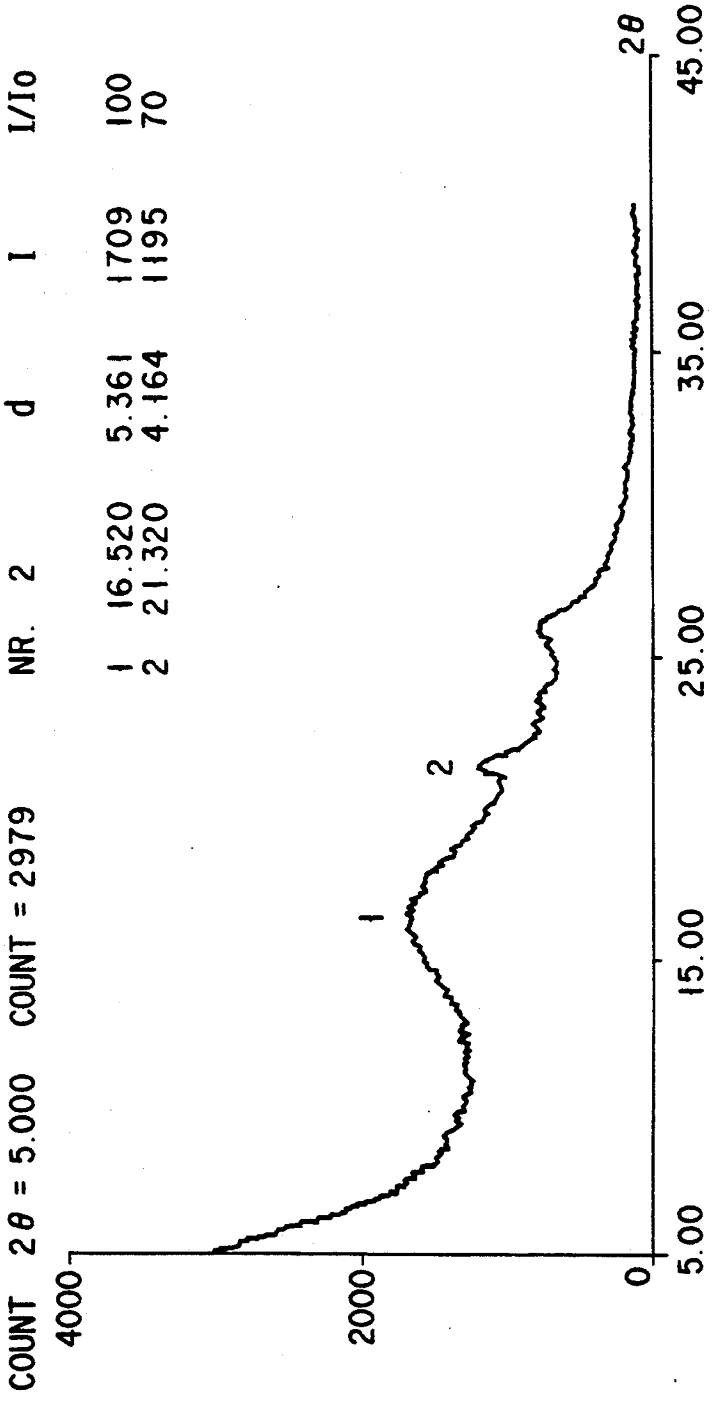
FIG. 6 is a graph showing an X-ray diffraction data obtained by Seemann-Bohlin method of an hot-melt ink layer according to Example 2-76 in the same condition as that in FIG. 4.
Figure 7:
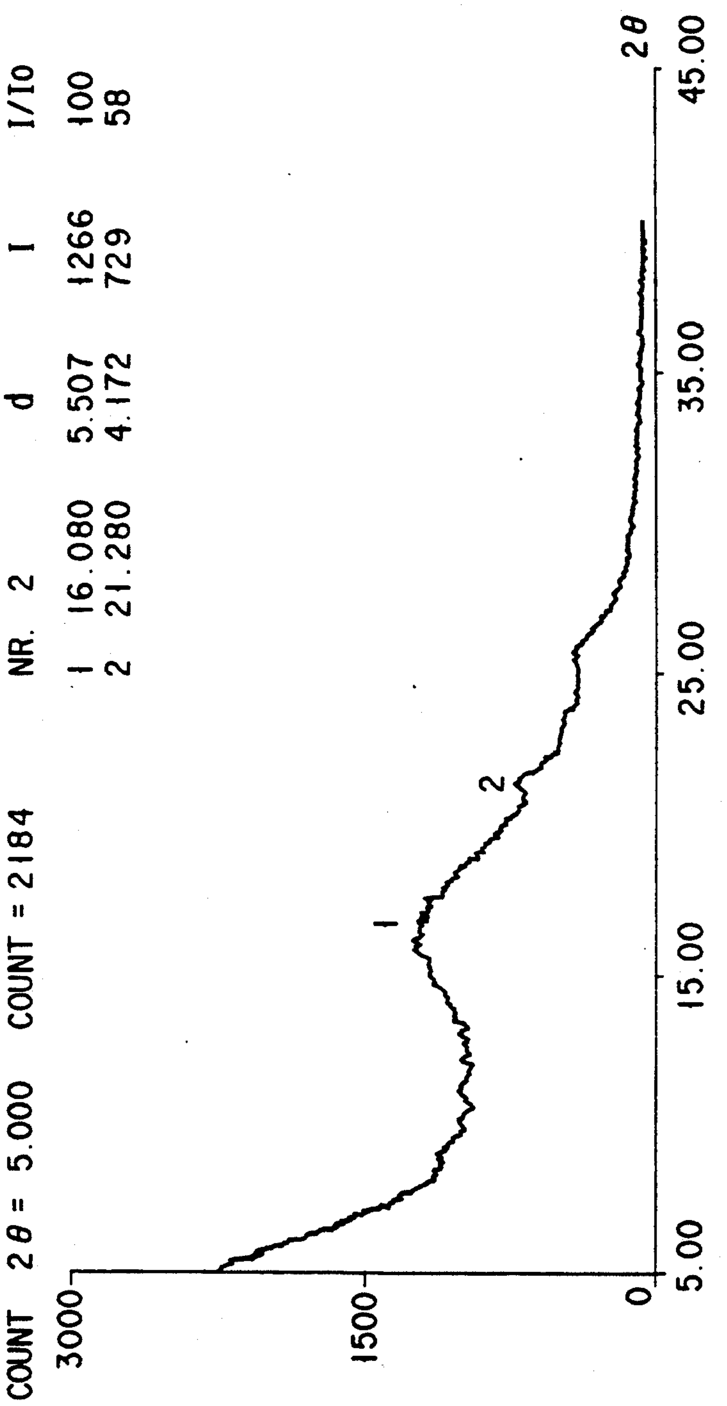
FIG. 7 is a graph showing an X-ray diffraction data obtained by Seemann-Bohlin method of an hot melt ink layer according to Example 2–77 in the same condition as that in FIG. 4.
Figure 8:
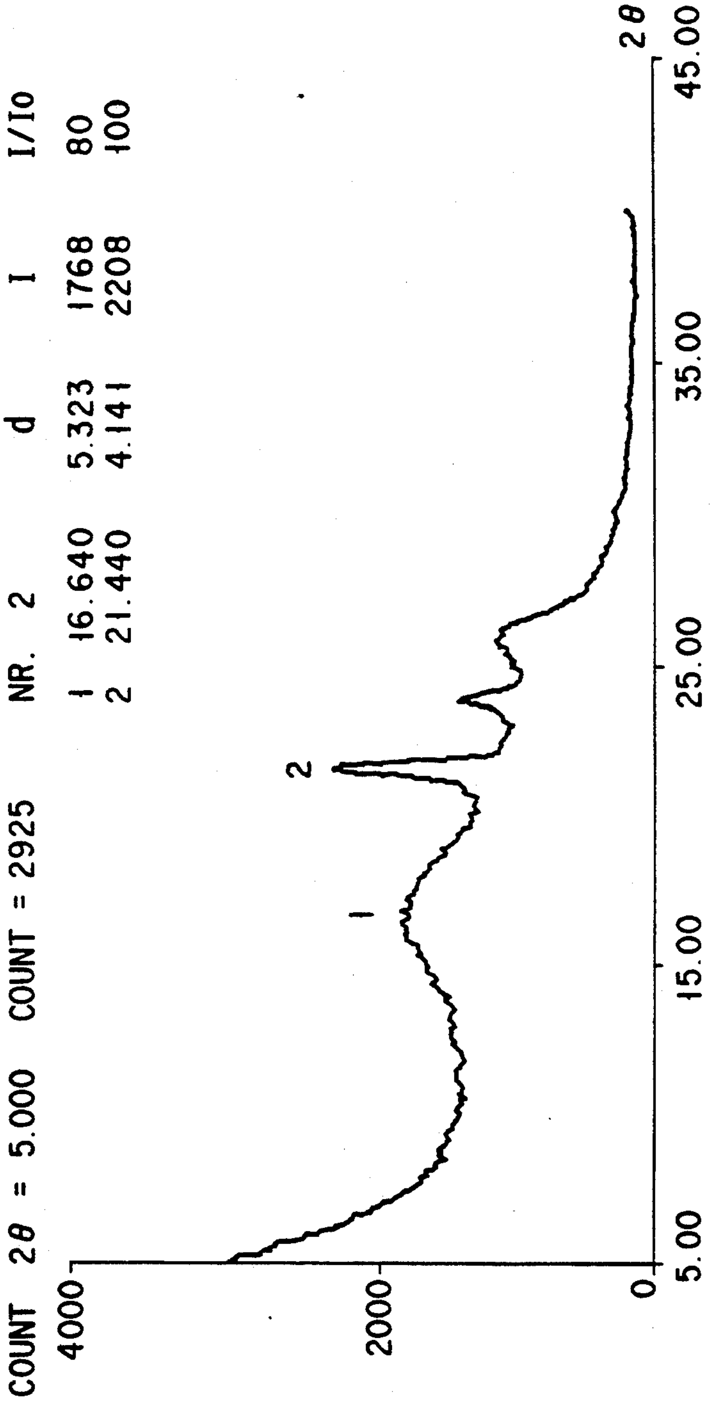
FIG. 8 is a graph showing an X-ray diffraction data obtained by Seemann-Bohlin method of an hot melt ink layer according to Control 2–28 in the same condition as that in FIG. 4.
Figure 9:
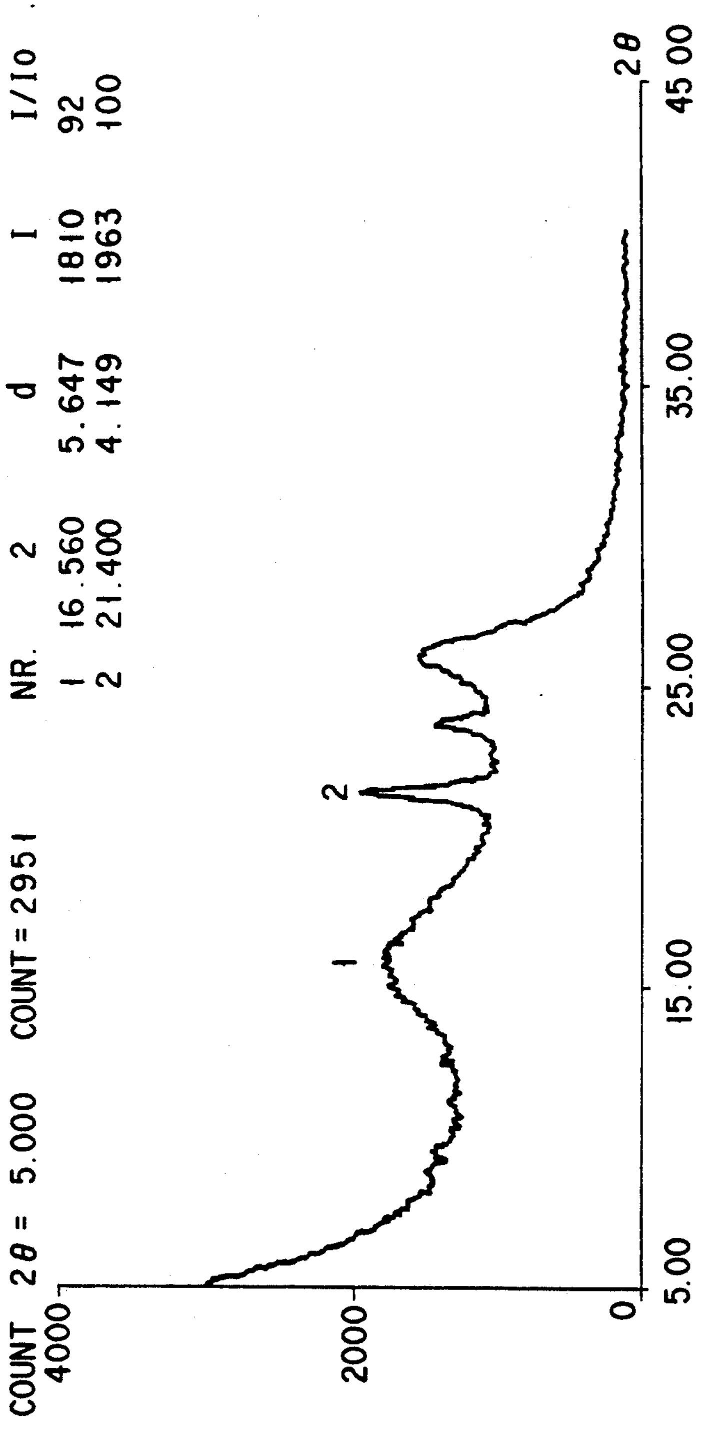
FIG. 9 is a graph showing an X-ray diffraction data obtained by Seemann-Bohlin method of an hot melt ink layer according to Control 2–29 in the same condition as that in FIG. 4.

With regard to some of the above Examples and Comparative Examples, graphs showing relationship between temperature and complex modulus or X-ray diffraction data are represented in FIG. 2 to FIG. 9, for reference. FIG. 2 and FIG. 3 are graphs showing each relationship between temperature and complex modulus with regard to Example 1-5 and Comparative Example 1-5.

FIG. 4 to FIG. 9 are graphs showing X-ray diffraction dates with regard to Example 2-74 to 2-77 and Comparative Example 2-28 and 2-29, respectively.

In general, the thermal transfer recording medium as described above may be incorporated in a conventional cassette case to form an ink ribbon cassette.

Additional advantages and modifications will readily occur to those skilled in the art. Therefore, the invention in its broader aspects is not limited to the specific details, and representative member, shown and described herein. Accordingly, various modifications may be made without departing from the spirit or scope of the general inventive concept as defined by the appended claims and their equivalents.

I claim:

1. A thermal transfer recording medium comprising:

a base sheet; and a hot-melt ink layer, formed on said base sheet, containing a colorant and a hot-melt material, which is selectively heated, melted, and transferred to a transfer medium, wherein said hot-melt material has a melting point Tm of 70° to 90° C., a magnitude complex modulus of $10^6$ Pa to $10^7$ Pa at 100° C., and a pour point Tp of not less than 150° C.

2. A medium according to claim 1, wherein said hot-melt ink layer has a heat absorption peak curve obtained by measurement using a differential scanning calorimeter to fall within a range of ±30° C. of a peak temperature.

3. A medium according to claim 1, wherein the pour point Tp falls within a range of 150° C. to 200° C.

4. A medium according to claim 1, wherein said colorant is a material selected form the group consisting of a pigment and a dye.

5. A multi-time thermal transfer recording medium comprising:

a base sheet; and a hot-melt ink layer, formed on said base sheet, containing a colorant and a hot-melt material, which is selectively heated, melted, and transferred to a transfer medium, wherein said hot-melt material has a melting point Tm of 70° to 90° C., a magnitude complex modulus of $10^6$ Pa to $10^7$ Pa at 100°, and a pour point Tp of not less than 150° C.

6. A thermal transfer recording medium comprising:

a base sheet; and a hot-melt ink layer, formed on said base sheet, containing a colorant, an ethylene-based crystalline material, and an ethylene-based resin material, which is selectively heated, melted, and transferred to a transfer medium, wherein said hot-melt ink layer is set in an amorphous or microcrystalline state and satisfies the following condition:

$$I/I_0 \leq 0.9$$

wherein I is the diffraction peak intensity in the range of 21.3° to 21.5° originating from an ethylene-based crystal and $I_0$ is the halo intensity in the range of 16° to 17° originating from an amorphous part when the hot-melt ink layer is measured by X-ray diffraction.

7. A medium according to claim 6, wherein said hot-melt ink layer has a heat absorption peak curve obtained by measurement using a differential scanning calorimeter to fall within a range of 35 30° C. of a peak temperature.

8. A medium according to claim 6, wherein said hot-melt ink layer satisfies the following condition:

$$I/I_0 \leq 0.8.$$

9. A medium according to claim 6, wherein said colorant is a material selected from the group consisting of a pigment and a dye.

10. A medium according to claim 6, wherein 30 to 50 wt % of said crystalline material are contained in said hot-melt ink layer.

11. A medium according to claim 6, wherein 15 to 30 wt % of said ethylene-based resin material are contained in said hot-melt ink layer.

12. A medium according to claim 6, wherein 30 to 50 wt % of said colorant are contained in said hot-melt ink layer.

13. A medium according to claim 6, wherein said ethylene-based crystalline material is at least one material selected from the group consisting of a low-molecular weight polyethylene oxide wax, paraffin oxide wax, carnauba wax, candelilla wax, rice wax, wood wax, beeswax, lanolin, coconut wax, oxide wax ester, oxide wax, urethane wax, alcohol wax, amide wax, bleached montan wax, nonbleached montan wax, purified montan wax, oxide montan wax, ester wax, partially saponified ester montan wax, polyolefin wax, rosin, rosin methylolamide, ester gum, and a higher fatty acid.

14. A medium according to claim 6, wherein said ethylene-based resin material is a copolymer of ethylene and at least one monomer selected from the group consisting of methylmethacrylate, ethylmethacrylate, n-propylmethacrylate, iso-propylmethacrylate, methacrylate, ethylacrylate, n-propylacrylate, iso-propylacrylate, acrylic acid, methacrylic acid, maleic acid, vinyl acetate, vinyl chloride and vinylidene chloride.

15. A multi-time thermal transfer recording medium comprising:

a base sheet; and a hot-melt ink layer, formed on said base sheet, containing a colorant, an ethylene-based crystalline material, and an ethylene-based resin material, which is selectively heated, melted, and transferred to a transfer medium, wherein said hot-melt ink layer is set in an amorphous or microcrystalline state and satisfies the following condition:

$$I/I_0 \leqq 0.9$$

where I is the diffraction peak intensity in the range of 21.3° to 21.5° originating from an ethylene-based crystal and $I_0$ is the halo intensity in the range of 16° to 17° originating from an amorphous part when the hot-melt ink layer is measured by X-ray diffraction.

16. A thermal transfer recording medium comprising:

a base sheet; and a hot-melt ink layer, formed on said base sheet and containing 30 to 50 wt % of a colorant, a crystalline material having an acid value of 5 to 40 mg KOH/g and a saponification value of 10 to 100 mg KOH/g, and 15–30 wt % of an ethylene-based resin containing a copolymer resin of ethylene and a monomer containing a carbonyl group, wherein said ethylene-based resin material has an ethylene content of 65 to 80 wt % and a melt index of not more than 60.

17. A medium according to claim 16, wherein said ethylene-based resin material has a melt index of 10 to 60.

18. A medium according to claim 16, wherein said hot-melt ink layer has a heat absorption peak curve obtained by measurement using a differential scanning calorimeter to fall within a range of ±30° C. of a peak temperature.

19. A medium according to claim 16, wherein 30 to 50 wt % of said crystalline material are contained in said hot-melt ink layer.

20. A medium according to claim 16, wherein 15 to 30 wt % of said ethylene-based resin material are contained in said hot-melt ink layer.

21. A medium according to claim 16, wherein 30 to 50 wt % of said colorant are contained in said hot-melt ink layer.

22. A medium according to claim 16, wherein 20 to 40 vol % of said colorant are contained in said hot-melt ink layer.

23. A medium according to claim 16, wherein said crystalline material is at least one material selected from the group consisting of paraffin wax oxide, carnauba wax oxide, candelilla wax, rice wax, wood wax, beeswax, lanolin, coconut wax, wax oxide ester, oxide wax, urethane wax, alcohol wax, amide wax, montan waxes, polyolefin wax, polyethylene wax oxide, rosin, rosin methylolamide, ester gum, and a higher fatty acid.

24. A medium according to claim 16, wherein said monomer containing said carbonyl group is at least one material selected from the group consisting of methylmethacrylate, ethylmethacrylate, n-propylmethacrylate, iso-propylmethacrylate, methylacrylate, ethylacrylate, n-propylacrylate, isopropylacrylate, acrylic acid, methacrylic acid, maleic acid, vinyl acetate, vinyl chloride, and vinylidene chloride.

25. A medium according to claim 16, wherein said medium is used as a multi-time thermal transfer recording medium.

* * * * *